(12) United States Patent
Sasaki

(10) Patent No.: US 7,265,480 B2
(45) Date of Patent: *Sep. 4, 2007

(54) VIBRATION WAVE LINEAR MOTOR AND A DRIVING METHOD THEREOF

(75) Inventor: Yasuo Sasaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 392 days.

This patent is subject to a terminal disclaimer.

(21) Appl. No.: 10/929,948

(22) Filed: Aug. 30, 2004

(65) Prior Publication Data

US 2005/0062346 A1    Mar. 24, 2005

(30) Foreign Application Priority Data

Sep. 18, 2003    (JP)    ............................. 2003-326881

(51) Int. Cl.
H02N 2/00    (2006.01)
(52) U.S. Cl. ........................... 310/323.01; 310/323.02; 310/323.09; 310/323.17; 310/312; 310/328
(58) Field of Classification Search ........... 310/323.01, 310/323.02, 323.04, 323.06, 323.09, 323.17, 310/323.18, 328, 312
See application file for complete search history.

(56) References Cited

U.S. PATENT DOCUMENTS

| 4,672,256 | A | * | 6/1987 | Okuno et al. ........... 310/323.07 |
| 4,736,131 | A | * | 4/1988 | Fujimoto .................... 310/328 |
| 5,089,740 | A | * | 2/1992 | Ono ........................... 310/328 |
| 5,644,440 | A | | 7/1997 | Akada ........................ 359/823 |
| 5,786,654 | A | * | 7/1998 | Yoshida et al. ............. 310/328 |
| 5,812,330 | A | | 9/1998 | Akada ........................ 359/823 |
| 5,890,391 | A | * | 4/1999 | Okada .......................... 74/128 |
| 6,188,161 | B1 | * | 2/2001 | Yoshida et al. ............. 310/328 |
| 6,380,660 | B1 | * | 4/2002 | Maeno et al. .......... 310/323.02 |
| 6,392,827 | B1 | * | 5/2002 | Ueyama et al. ............. 359/824 |
| 6,809,461 | B2 | * | 10/2004 | Kurita et al. ................ 310/328 |
| 6,841,899 | B2 | * | 1/2005 | Kaneko ........................ 310/12 |
| 6,989,623 | B2 | * | 1/2006 | Zeighami ..................... 310/317 |
| 7,053,525 | B2 | * | 5/2006 | Funakubo et al. ...... 310/323.16 |
| 2005/0029876 | A1 | * | 2/2005 | Sasaki et al. ................. 310/12 |

FOREIGN PATENT DOCUMENTS

| JP | 04-069072 | 3/1992 |
| JP | 07-163162 | 6/1995 |
| JP | 8-179184 | 7/1996 |
| JP | 09-149664 | 6/1997 |
| JP | 2005-94956 | * 4/2005 |

* cited by examiner

*Primary Examiner*—Thomas M. Dougherty
(74) *Attorney, Agent, or Firm*—Scully, Scott, Murphy & Presser, P.C.

(57) ABSTRACT

A vibration wave linear motor is a vibration wave linear motor that can drive a plurality of driving targets with a simple and small configuration. In the linear motor, two guide members sandwich two vibrators, which are individually and electrically connected to a driving circuit by a flexible board and an electrode connecting part, and individually driven with an independent operation. Two lens frames are individually driven by the two vibrators via a pin member, a board spring, and an engagement protruding part. For example, in a lens apparatus, one of the two lens frames holds a lens unit in the third group, which is involved in focus achievement, whereas the other lens frame holds a lens unit in the second group, which is involved in zooming.

20 Claims, 19 Drawing Sheets

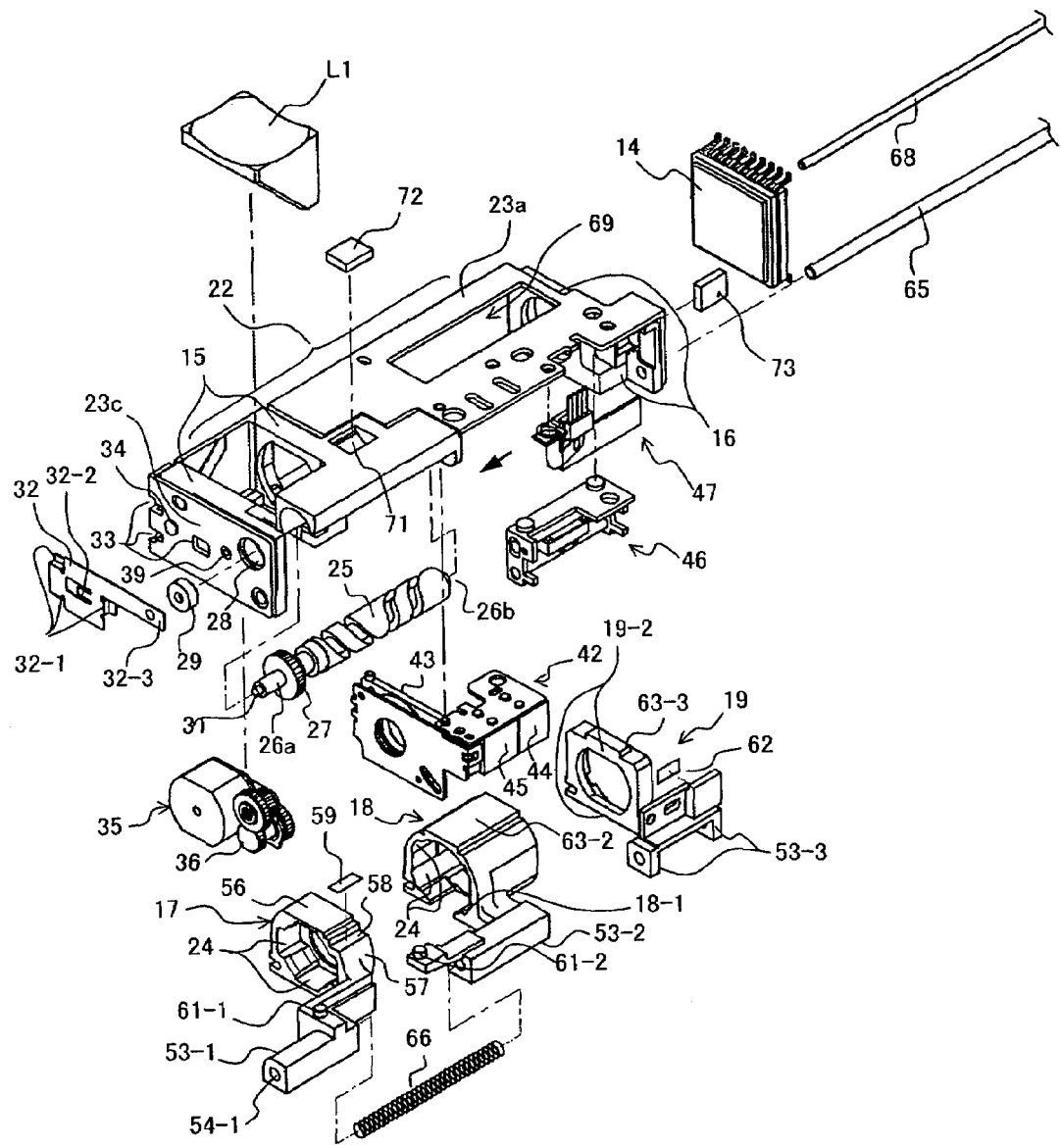
F I G. 2

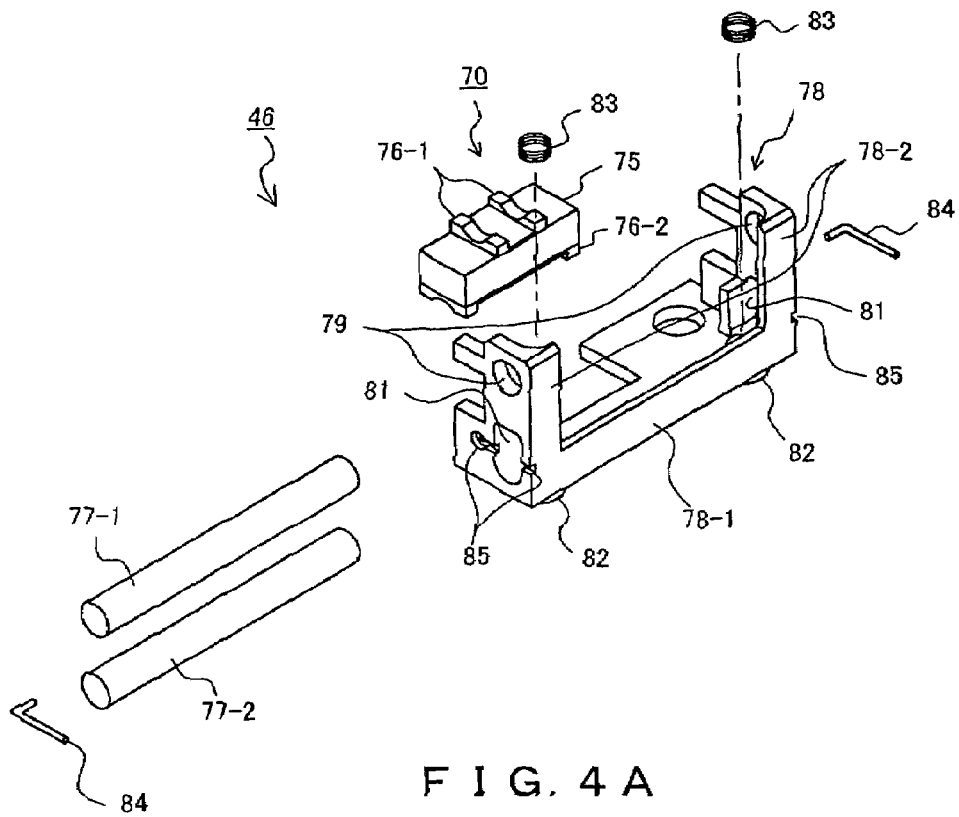
F I G. 4 A
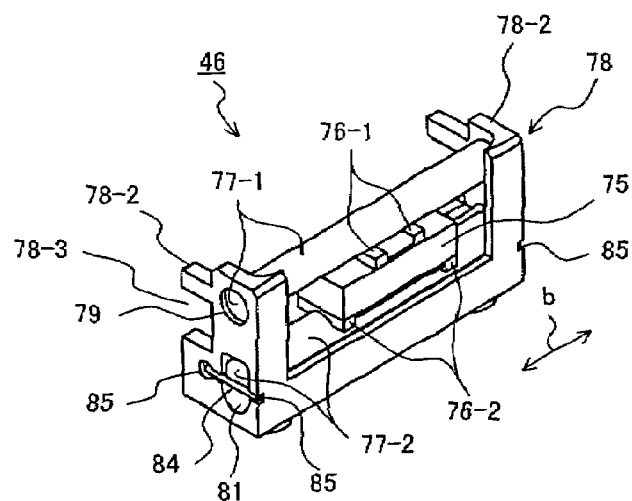
F I G. 4 B

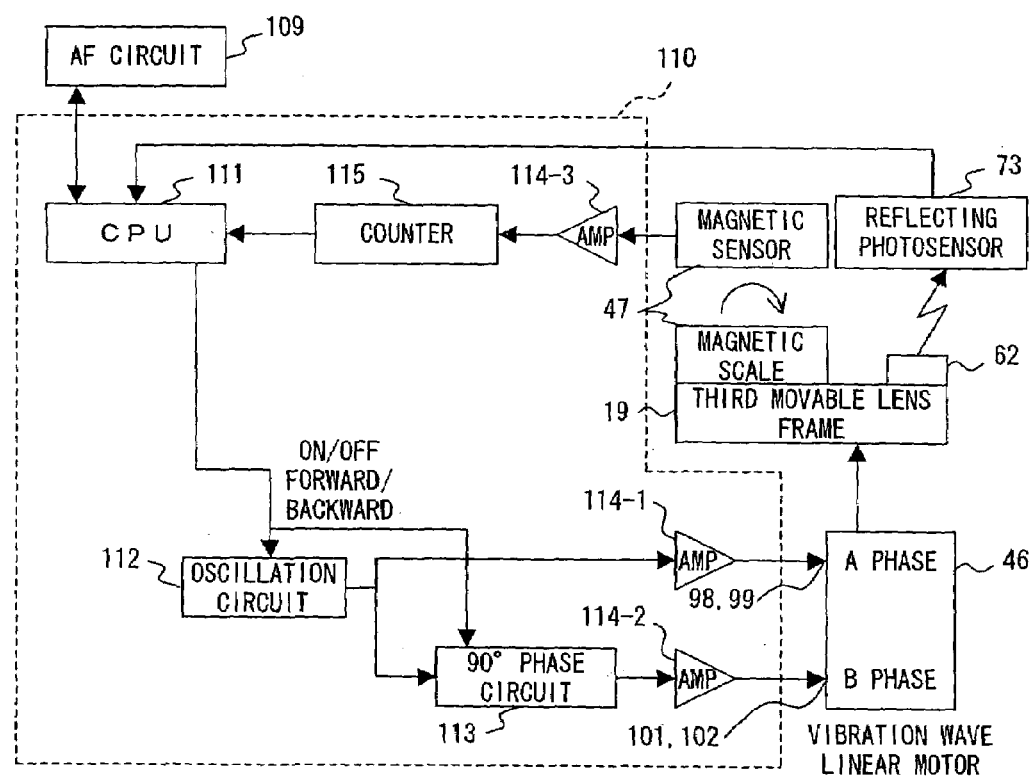
F I G. 6

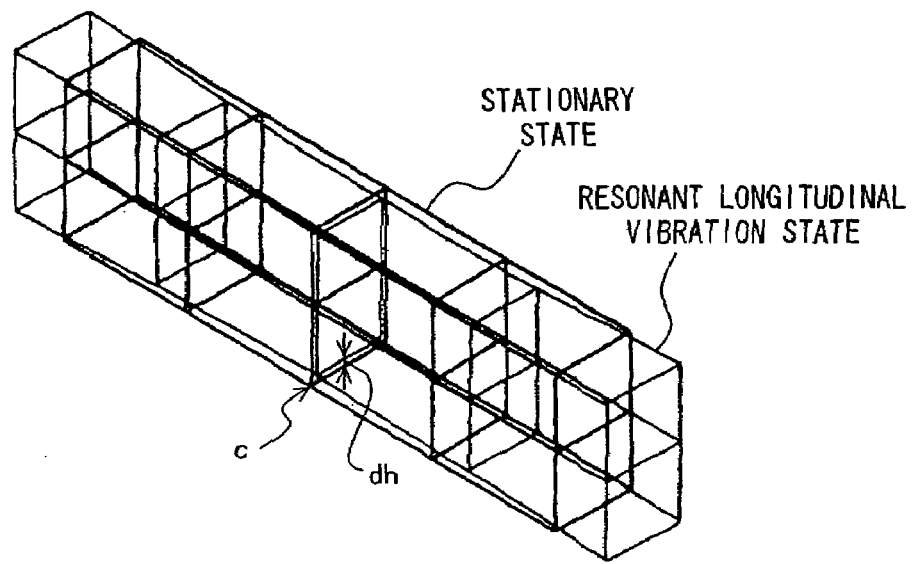
F I G. 7A
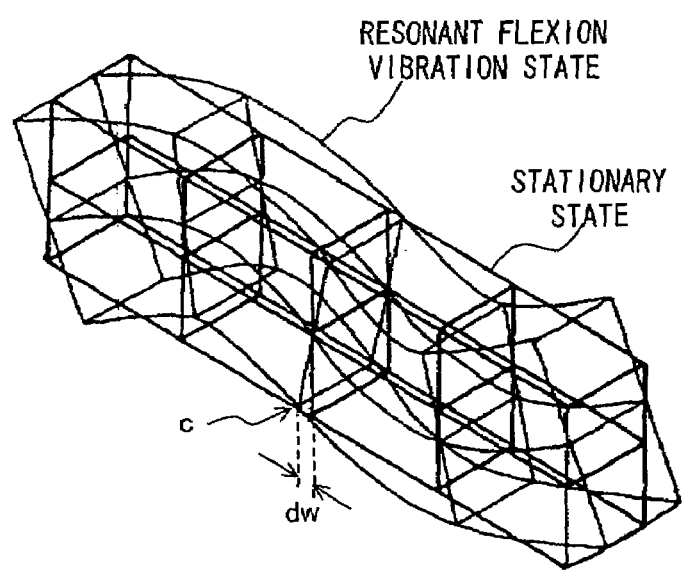
F I G. 7B

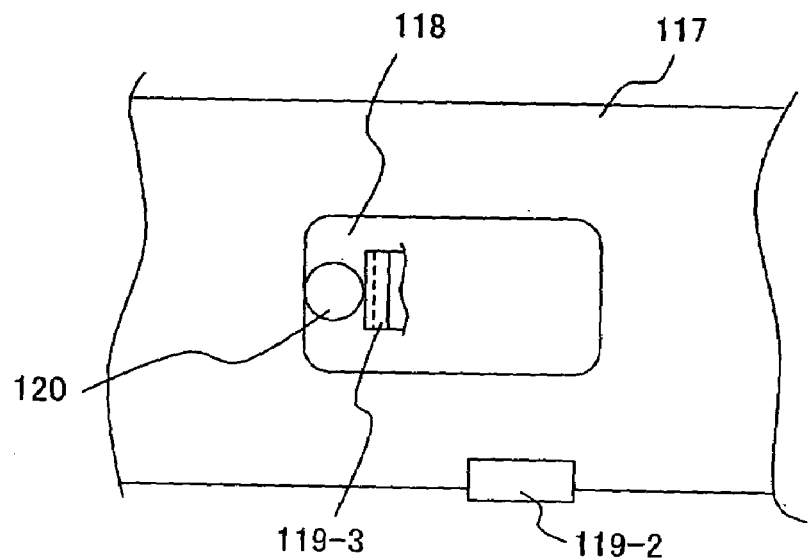
F I G. 1 0 A
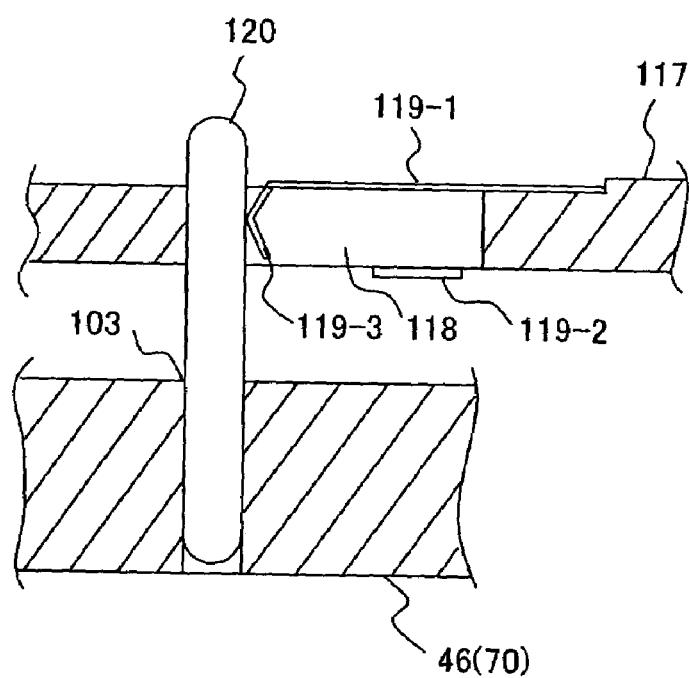
F I G. 1 0 B

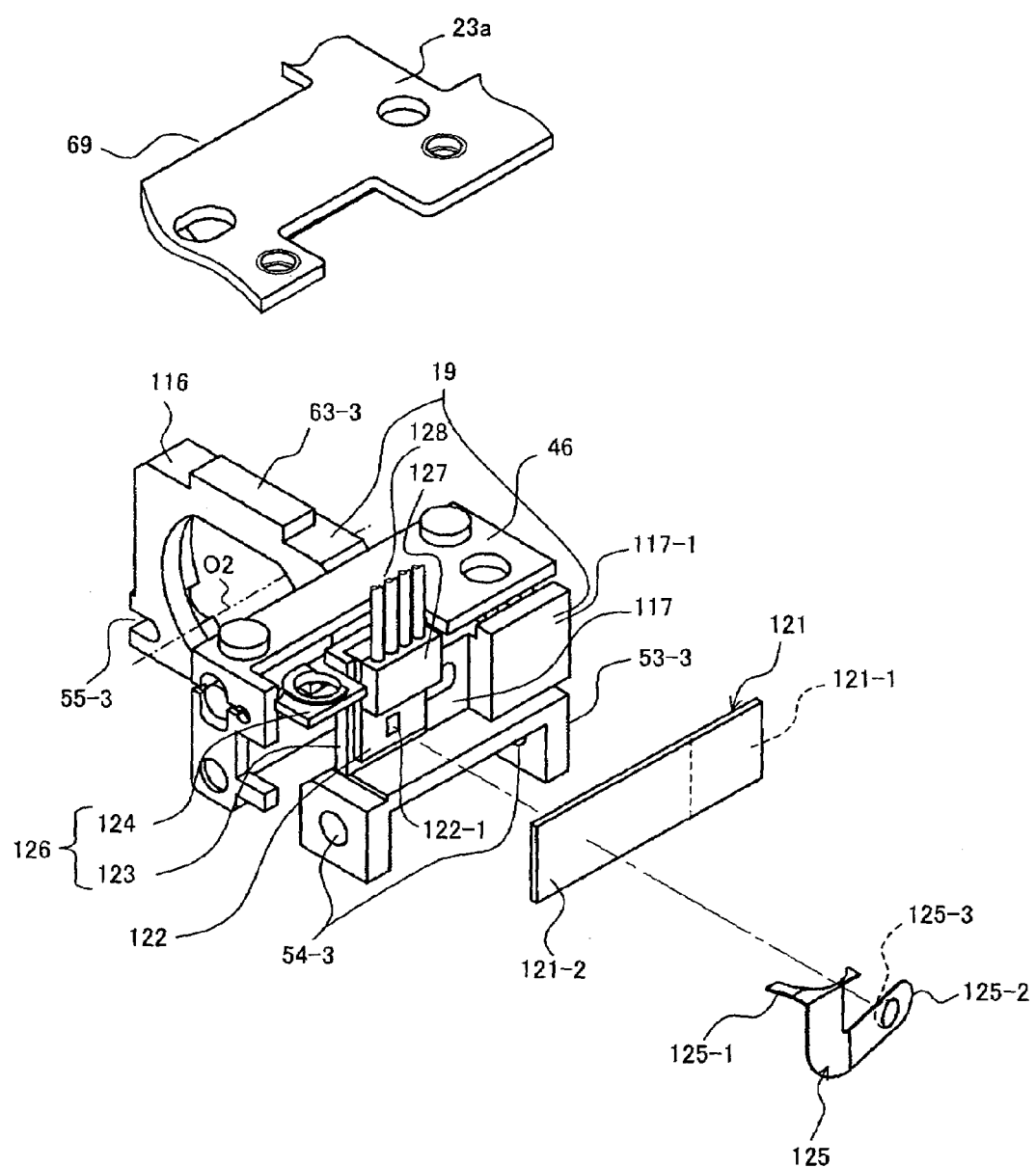
F I G. 1 1

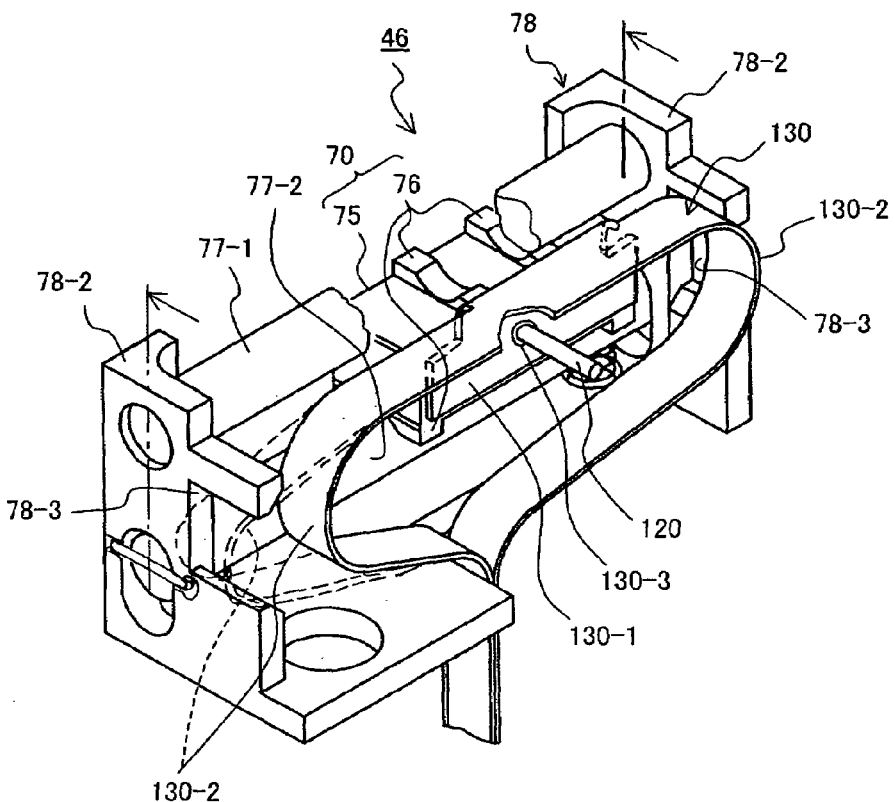
F I G. 1 2 A
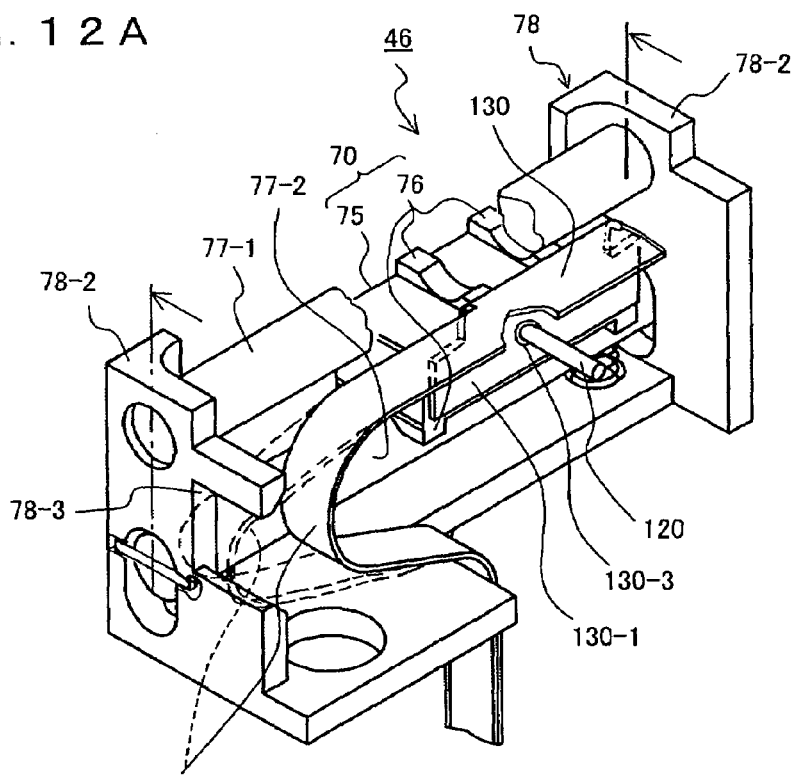
F I G. 1 2 B

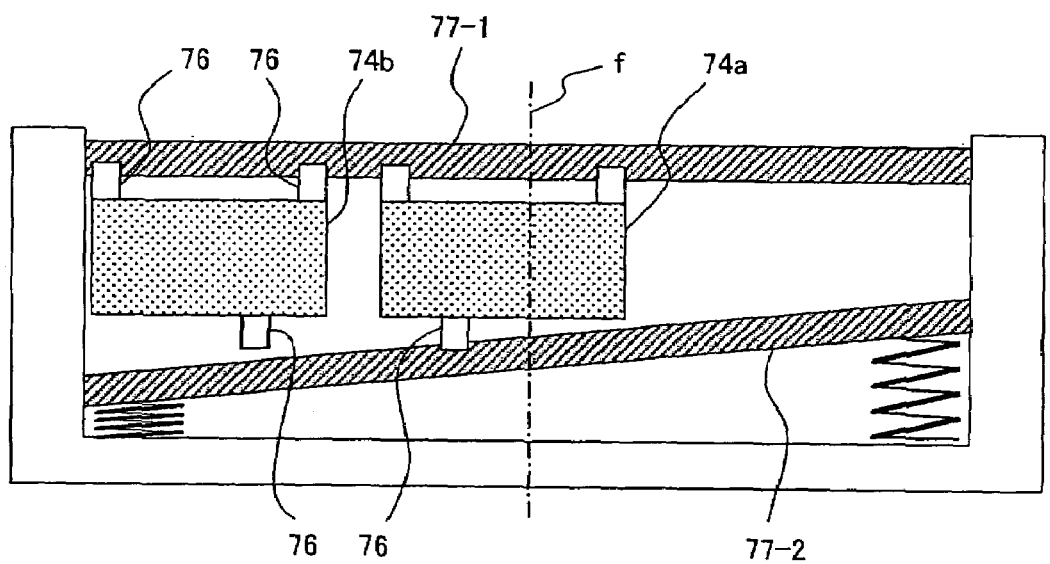
F I G. 17

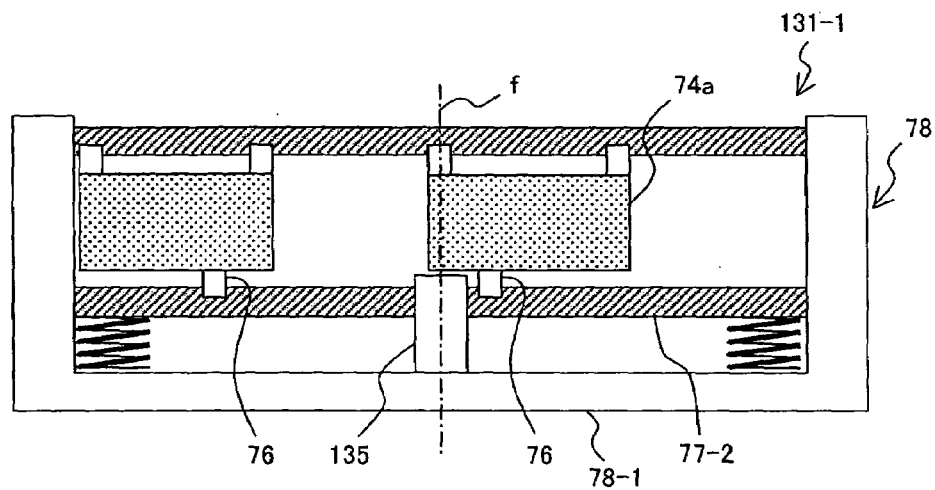
F I G. 1 8 A
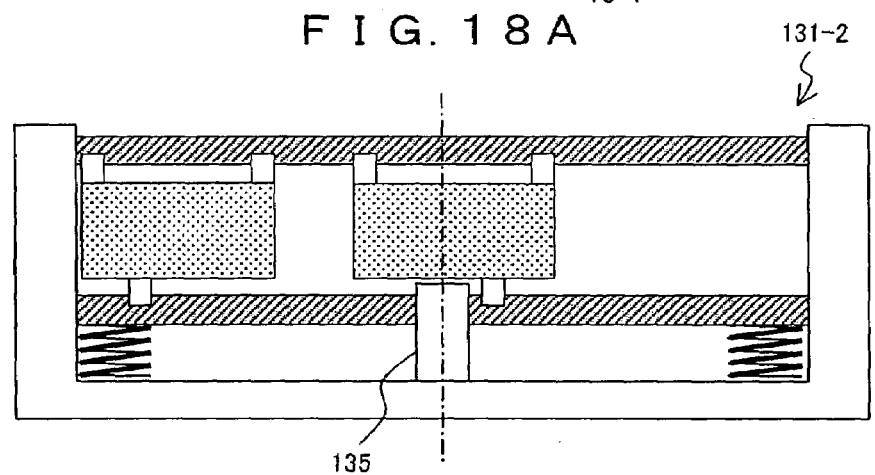
F I G. 1 8 B
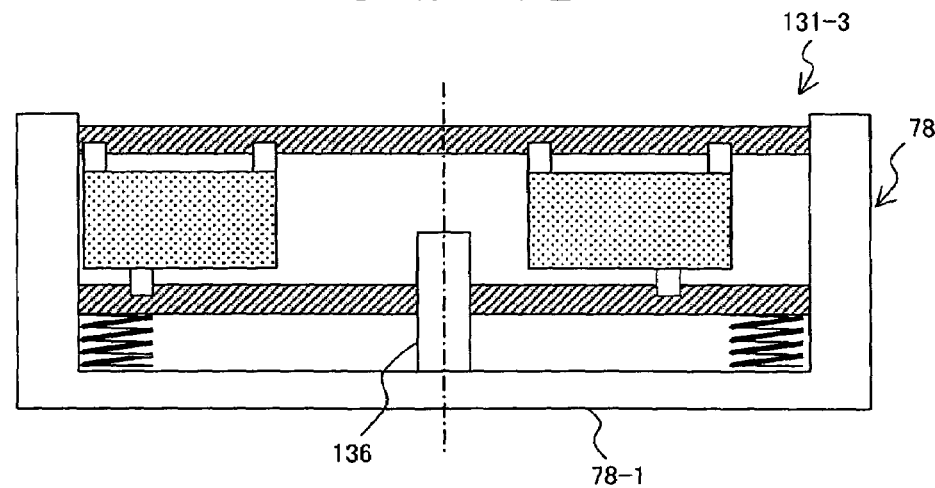
F I G. 1 8 C

VIBRATION WAVE LINEAR MOTOR AND A DRIVING METHOD THEREOF

CROSS REFERENCE TO RELATED APPLICATION

This application is based upon and claims the benefit of priority from the prior Japanese Application No. 2003-326881, filed Sep. 18, 2003, the entire contents of which are incorporated herein by reference.

BACKGROUND OF THE INVENTION

1. Field of the Invention

The present invention relates to a vibration wave linear motor using a vibrator, and more particularly, to a vibration wave linear motor that can be reduced in size with a simple configuration.

2. Description of the Related Art

In recent years, attention has been paid to an ultrasonic motor (vibration wave motor) as a new motor replacing an electromagnetic motor. This ultrasonic motor has advantages such that (a) high thrust at a low speed can be obtained without a gear, (b) holding force is high, (c) a stroke is long, and a resolution is high, (d) noise is very low, and (e) magnetic noise is not caused, and noise influence is not exerted, in comparison with a conventional electromagnetic motor.

As a conventional ultrasonic motor having such advantages, a linear-type ultrasonic motor as one basic form using an ultrasonic vibrator is proposed by the present applicant (for example, paragraphs [0035] to [0040], and FIGS. 7 and 18 of Japanese Patent Publication No. HEI07-163162).

Additionally, it is proposed by utilizing the above described characteristics that an ultrasonic motor is used as a driving source for moving a lens frame of a camera backward and forward by providing a vibrator integrally with the lens frame, which is a lens holding member, and by moving the lens frame backward and forward with reference to a fixed shaft with the vibrator (for example, see Abstract of the Disclosure, and FIG. 1 of Japanese Patent Publication No. HEI08-179184).

Also a card carrying apparatus using an ultrasonic motor is proposed. This ultrasonic motor comprises a ring-shaped vibration board that vibrates in multiple modes, and a pair of guide rails where grooves for guiding the vibration board are formed. As one of the guide rails, a movable rail is arranged, and presses the vibration board. As a result, the vibration board linearly moves along the guide rails by being vibrated (for example, see line 20 in the left column on page 3 to line 13 in the left column on page 4, and FIGS. 1 and 3 of Japanese Patent Publication No. HEI04-069072).

Furthermore, a linear ultrasonic motor that linearly moves a shaft by pressing a vibrator and the shaft to be driven with the use of a pressure roller, and by ultrasonic-vibrating the vibrator is proposed. Besides, it is recited that the cross section of the vibrator is made V-shaped or arc-shaped in the pressing portion of the vibrator and the shaft (for example, see Abstract of the Disclosure, and FIG. 1 of Japanese Patent Publication No. HEI09-149664).

SUMMARY OF THE INVENTION

A vibration wave linear motor according to the present invention is configured to comprise: two vibrators respectively having a vibrator unit configured to comprise a piezoelectric unit, and at least one driving contacting part respectively provided on two opposed surfaces of the vibrator unit; two guide members sandwiching the two vibrators via the driving contacting parts; and a pressing member pressing one of the two guide members toward the other, and generating pressing force between the two guide members and the driving contacting parts, wherein the driving contacting parts convert a vibration generated by applying a voltage to the vibrator unit into driving force, whereby the two vibrators and the two guide members make a relative move.

BRIEF DESCRIPTION OF THE DRAWINGS

FIG. 1B is a schematic showing a simplified configuration of respective lens units when a cross section, taken along an arrow line A–A', of the lens apparatus shown in FIG. 1A is viewed in the direction of an arrow a;

FIG. 2 is a perspective view showing the disassembly of the lens apparatus when viewed from upward;

FIG. 4A is a perspective view showing the disassembly of an ultrasonic linear motor according to one preferred embodiment;

FIG. 4B is a perspective view showing the assembled state of the ultrasonic linear motor shown in FIG. 4A;

FIG. 6 is a circuit diagram showing a driving circuit driving and controlling the vibration wave linear motor;

FIGS. 7A and 7B are perspective views schematically explaining ultrasonic elliptical vibrations of the vibrator unit of the vibration wave linear motor;

FIG. 10A is a schematic showing FIG. 9B when viewed in the direction of an arrow c;

FIG. 10B is a cross-sectional view of FIG. 9B when taken along an arrow line A–A'; and FIG. 11 is a partial disassembly perspective view showing the detailed configuration of the magnetic sensor unit along with the vibration wave linear motor where the magnetic sensor unit is assembled, and the third movable lens frame;

FIG. 12A is a perspective view showing the vibration wave linear motor, and a flexible board which is branched and arranged between the external electrodes of the vibrator of the vibration wave linear motor and a driving circuit;

FIG. 12B is a perspective view showing a flexible board which is not branched;

FIG. 17 shows a case where a faulty contact occurs between either of two vibrators and a movable shaft;

FIGS. 18A, 18B, and 18C are schematics showing a configuration for preventing a faulty contact from occurring in the vibration wave linear motor of a two-vibrator type according to the second preferred embodiment.

DESCRIPTION OF THE PREFERRED EMBODIMENTS

Preferred embodiments according to the present invention are described below with reference to the drawings.

First Preferred Embodiment

<Lens Apparatus Comprising a Vibration Wave Linear Motor>

Figure 1A:
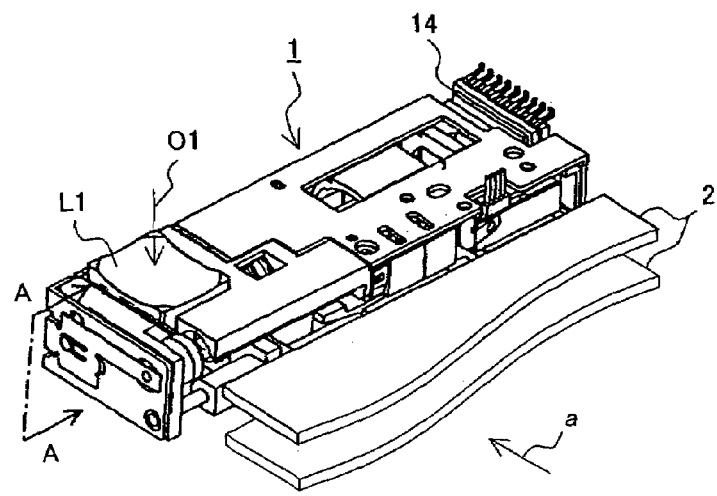
FIG. 1A is a perspective view showing the outer appearance of a lens apparatus comprising a vibration wave linear motor according to the present invention.
Figure 1B:
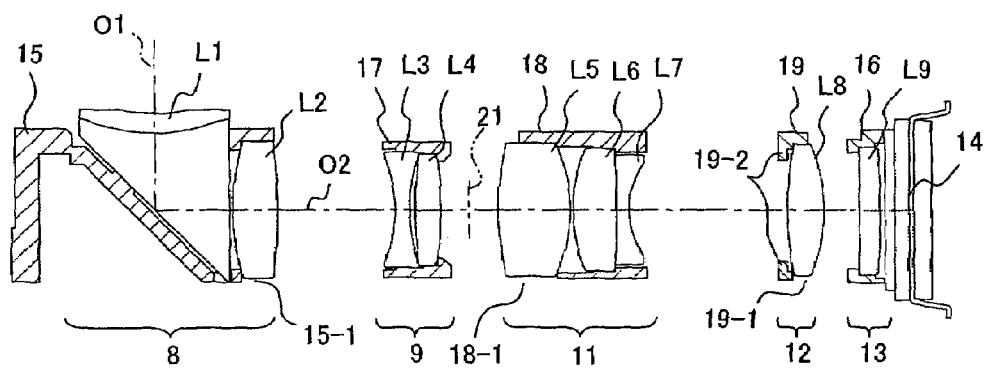

FIG. 1A is a perspective view showing the outer appearance of a lens apparatus comprising a vibration wave linear motor according to the present invention, whereas FIG. 1B is a cross-sectional view, taken along an arrow line A–A', of the lens apparatus shown in FIG. 1A when viewed in the direction of an arrow a in FIG. 1A, and shows a simplified configuration of respective lens units.

FIG. 1A also shows a portion of a circuit board 2 comprising a control circuit which controls the driving of respective units of the lens apparatus 1 assembled within the housing of a main body apparatus such as a camera, etc. along with the lens apparatus 1.

The lens apparatus 1 shown in FIG. 1A reflects a pencil of light from a subject, which is incident from a shooting lens window of the housing of a main body apparatus not shown to a lens L1 along a shooting optical axis O1 (indicated by the vertical direction in FIG. 1), to be bent almost at a right angle in the horizontal direction (an obliquely upper right direction in FIG. 1) by using a prism formed integrally with the lens L1. This lens apparatus 1 generates a captured image by guiding the incident pencil of light to an image capturing element 14, which is provided at the end (the end in the obliquely upper right direction in FIG. 1) of the lens apparatus 1 and configured, for example, by a CCD, etc., along the bent second optical axis O2 shown in FIG. 1B.

As shown in FIG. 1B, the lens apparatus 1 includes a plurality of lenses configured by a first fixed lens unit 8 composed of lenses L1 and L2, a first movable lens unit 9 composed of lenses L3 and L4, a second movable lens unit 11 composed of lenses L5, L6, and L7, a third movable lens unit 12 composed of a lens L8, and a second fixed lens unit 13 composed of a lens L9, along the second optical axis O2 bent in the horizontal direction. Additionally, the image capturing element 14 is arranged at the dead end of these lens groups.

The lens L1 of the first fixed lens unit 8 is formed integrally with a prism that changes the course of the pencil of light along the second optical axis O2 by reflecting the pencil of light from the subject, which is incident from the above described shooting lens window along the shooting optical axis O1, to be bent almost by 90° in the horizontal direction. The lens L1 is held by a first fixed lens frame unit 15 along with the lens L2, and fixed within the lens apparatus 1.

The first fixed lens frame unit 15 and the second fixed lens frame unit 16 are integrally formed by being molded with resin at the end of a metal frame, which will be described later and has an almost L-shaped cross section cut vertically with reference to the second optical axis O2, in a long side direction.

Between the first fixed lens frame unit 15 and the second fixed lens frame unit 16, a first movable lens frame 17 holding the first movable lens unit 9, a second movable lens frame 18 holding the second movable lens unit 11, and a third movable lens frame 19 holding the third movable lens unit 12 are arranged.

The first movable lens frame 17, the second movable lens frame 18, and the third movable lens frame 19 respectively hold the first movable lens unit 9, the second movable lens unit 11, and the third movable lens unit 12 to be independently movable along the second optical axis O2 that is bent almost at the right angle by the lens L1 (also referred to as the prism L1 hereinafter).

The first movable lens unit 9 and the second movable lens unit 11 are provided to change the focal distance of the pencil of light of the subject, which is incident along the second optical axis O2 of the optical system of the lens apparatus 1. In other words, the first movable lens frame 17 and the second movable lens frame 18, which respectively hold the first movable lens unit 9 and the second movable lens unit 11, are provided to adjust the zoom ratio of the lens system.

Additionally, the third movable lens unit 12 is provided to adjust a focus at which the pencil of light forms an image on the image capturing unit 14. In other words, the third movable lens frame 19 holding the third movable lens unit 12 is provided as a lens frame for achieving a focus, which can freely move in the direction of the second optical axis O2.

Furthermore, 21 between the first movable lens unit 9 and the second movable lens unit 11 indicates a position of an aperture.

Still further, in this lens unit, frame cut parts 15-1, 18-1, and 19-1 are formed by cutting a portion or the whole of frame walls (portions corresponding to the bottoms of the lenses in a lower portion in the example shown in FIG. 1B), in either of the upper and lower portions of the second optical axis O2, of the first fixed lens frame unit 15, the second movable lens frame 18, and the third movable lens frame respectively holding the first fixed lens unit 8, the second movable lens unit 11, and the third movable lens unit 12, which respectively include the lenses L2, L5, and L8 of relatively large diameters, in order to make the thickness in the direction of height (actually, a thickness in the direction of depth as a lens unit for shooting) as thin as possible.

For the second and the third movable lens frames 18 and 19, the strengths of which become weak by the amount of the cut frame walls, and which do not have another reinforced portion unlike the first fixed lens frame 15, a convex part which protrudes externally and will be described later, is provided on a side opposite to the cut parts with reference to the second optical axis O2, namely, on the frame walls on the top surface. The reason why the frame walls of the second and the third movable lens frames 18 and 19 on the top surface look slightly thick in FIG. 1B is that the cross sections of the convex parts are depicted.

Additionally, since the whole of the third movable lens frame 19 is thin and weak in the direction of a width, it can be possibly insufficient to make reinforcement only with the above described convex parts. Therefore, a protruding part 19-2 is provided to wrap from a lens barrel part formed on a side opposite to the cut part 19-1 formed at the bottom of the lens L8 toward the left hand side, which is out of range of the effective light beam of the lens L8.

FIG. 2 is a perspective view showing the disassembly of the lens apparatus 1 when viewed from upward.

Figure 3:
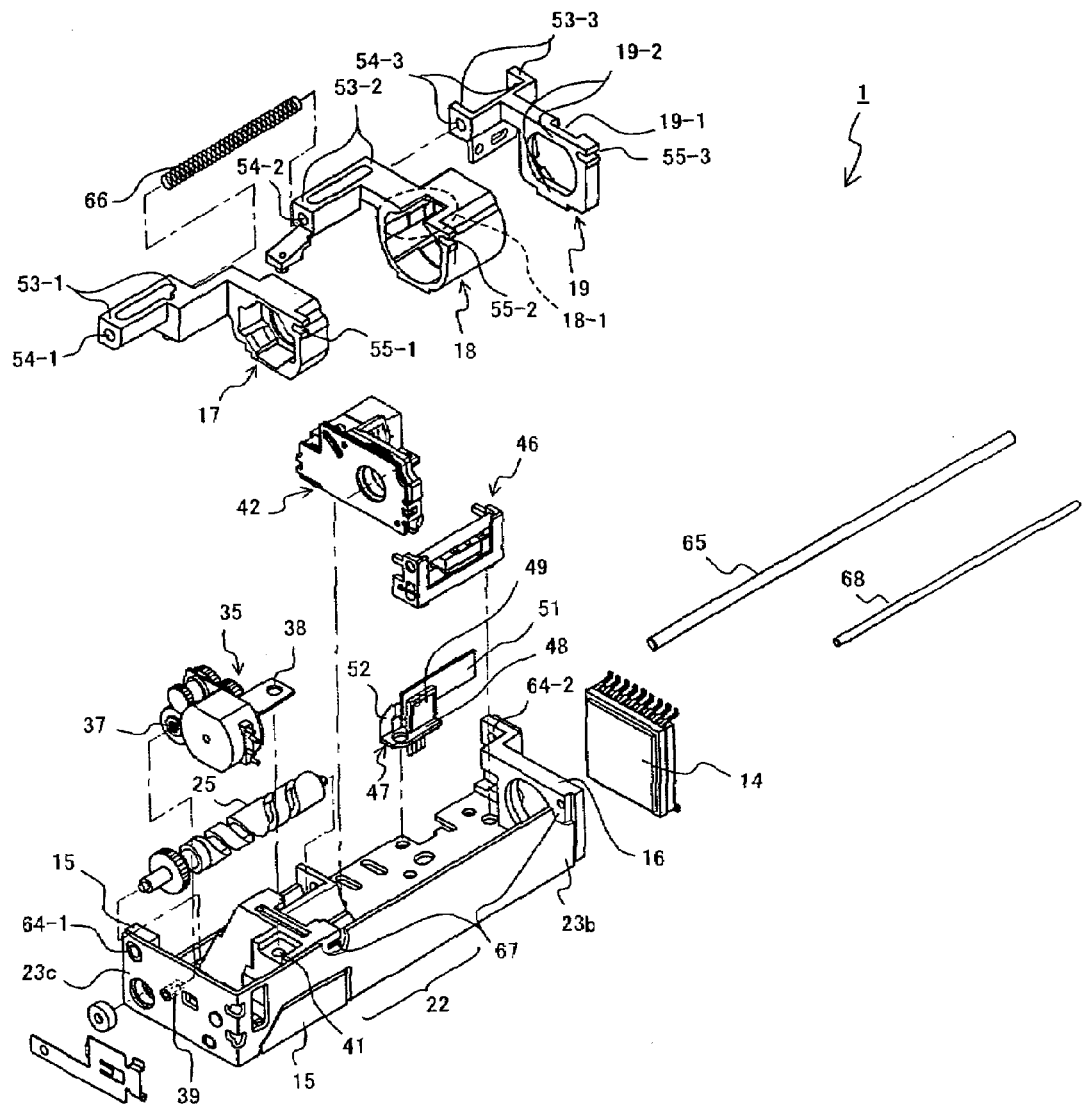
FIG. 3 is a perspective view showing the disassembly of the lens apparatus upside down when viewed from downward.

FIG. 3 is a perspective view showing the disassembly of the lens apparatus 1 upside down when viewed from downward. In FIGS. 2 and 3, the same constituent elements as those shown in FIGS. 1A and 1B are denoted with the same reference numerals.

As shown in FIGS. 2 and 3, the lens apparatus 1 comprises a main fixed lens frame 22. When all of the constituent elements shown in FIG. 2 or 3 are assembled and accommodated inside and outside the main fixed lens frame 22, the whole of the lens apparatus 1 has an outer shape, shown in FIG. 1A, of the main body of the apparatus where the constituent elements are comprised on two main surfaces of opposed rectangles, and included in a flat space enclosed by the two main surfaces.

The above described main fixed lens frame 22 comprises a metal frame 23*a* forming at least one of the above described 2 main surfaces. In the configuration of this lens apparatus 1, the other main surface is made open. Also one side surface of the flat space enclosed by the one main surface formed by the metal frame 23*a* and the other open main surface is configured by a metal frame 23*b* provided almost at a right angle from the metal frame 23*a* being the one main surface.

Additionally, also one side surface in the short side direction (the side surface in the obliquely lower left short side direction in FIGS. 2 and 3) is configured by a metal frame 23, which is almost perpendicular to the metal frame 23*a* being the main surface, and the metal frame 23*b* being the side surface in the long side direction.

In this way, the metal frames 23 (23*a*, 23*b*) configure an L-shaped metal frame whose cross section perpendicular to the long side direction (also the above described bent direction of the second optical axis O2) is composed of one main surface and one side surface in the long direction, and a frame having an ideal structure implementing high rigidity with a small amount of a material.

At both ends of the metal frame 23 in the long side direction, a fixed molded part formed integrally with the metal frame 23 by using outsert molding is respectively formed. These two fixed molded parts are the first fixed lens frame unit 15 and the second fixed lens frame unit 16, which are also shown in FIG. 1B.

In the first fixed lens frame unit 15, the prism L1 also shown in FIG. 1B, and the lens L2 not shown in FIGS. 2 and 3 are held and fixed. Additionally, in the second fixed lens frame unit 16, the lens L9 which is shown in FIG. 1B but not shown in FIGS. 2 and 3 is held and fixed.

Between the first fixed lens frame unit 15 and the second fixed lens frame unit 16, the 3 movable lens frames (the first movable lens frame 17, the second movable lens frame 18, and the third movable lens frame 19), which are also shown in FIG. 1B, are arranged.

In the three movable lens frames and the two fixed lens frames, an adhesive storing part 24 (see FIG. 2), which prevents an adhesive holding and fixing a lens from overflowing. The adhesive storing part 24 is a tiny space formed between the round surface of the fixed lens and the lens frame.

Adhesive storing parts of the third movable lens frame 19 and the second fixed lens frame unit 16 are not shown in FIGS. 2 and 3 because they are hidden. An adhesive storing part of the first fixed lens frame unit 15 is provided in a portion corresponding to the side surface of the prism formed integrally with the lens L1, although this is not shown.

Before the above described three movable lens frames are assembled, a zooming shaft cam 25 is arranged adjacently to the side surface of the main fixed lens frame 22 on the open side in the long side direction, and to the side surface of the first fixed lens frame unit 15. The zooming shaft cam 25 comprises a large diameter part forming a round surface on which cam grooves of a cam unit is provided, and small diameter parts 26 (26*a*, 26*b*) that are provided to protrude from both of the ends of the large diameter part on the shaft. In the small diameter part 26*a* that is provided to protrude at the end on the side opposite to the image capturing element 14, a gear 27 is fixed.

After the small diameter part 26*a* of the zooming shaft cam 25 is inserted into a shaft bearing insertion hole 28 formed in a part bonded integrally with the metal frame 23*c* of the first fixed lens frame unit 15, the other small diameter part 26*b* is inserted into a shaft bearing hole which is hidden and not shown, and formed in the first fixed lens frame unit 15 while pulling the zooming shaft cam 25 in the obliquely right direction in FIG. 2, so that the small diameter part 26*a* is engaged with a shaft bearing 29 in the shaft bearing insertion hole 28. As a result, the zooming shaft cam 25 is held to be rotatable for the first fixed lens frame unit 15.

At the tip of the small diameter part 26*a* of the zooming shaft cam 25, a convex part 31 having a smaller diameter is formed. The convex part 31 externally protrudes upward from the shaft bearing 29 when the small diameter part 26*a* engages with the shaft bearing 29. This convex part 31 is pressed by a pressing board spring 32, whereby the zooming shaft cam 25 is aligned by the upper and the lower shaft bearings to be stably supported.

The pressing board spring 32 is configured by: 3 bent leg parts 32-1 formed by separating a portion of each leg with a notch from an almost square main body, by being bent downward, and by bending the tip to be horizontal; a stop section 32-2 formed by cutting the center of the main body; and a pressing spring part 32-3 formed by being extended integrally from the main body.

In the meantime, on the side of the metal frame 23*c*, 3 notches 33 are formed in positions corresponding to the 3 bent leg parts 32-1 of the pressing board spring 32, and a convex part 34 corresponding to the stop section 32-2 of the pressing board spring 32 is formed almost at the center enclosed by the 3 notches 33.

When the main body of the pressing board spring 32 is pushed into the side of the metal frame 23c while engaging the 3 bent leg parts 32-1 of the pressing board spring 32 with the 3 notches 33 of the metal frame 23c, the tip of the stop section 32-2 engages with the surface of the convex part 34. As a result, the pressing board spring 32 is fixed on the outer surface of the metal frame 23c, and the convex part 31 of the zooming shaft cam 25 is pressed by the tip of the pressing spring unit 32-3, so that the zooming shaft cam 25 is aligned.

As a result, the zooming shaft cam 25 is arranged in the neighborhood of the prism L1 held by the first fixed lens frame unit 15 to be orientated in the long side direction of the main fixed lens frame 22, namely, in parallel with the second optical axis O2, and arranged so that at least a portion in the shaft direction is adjacent to the side surface of the prism L1.

Then, a zooming motor unit 35 is arranged in a space (see FIG. 3) shaped almost like a triangle pole, which is formed by a slope of the first fixed lens frame unit 15 holding the back side of the reflection plane of the lens (prism) L1, and the metal frame 23c, and its reduction gear train 36 engages with the gear 27 of the zooming shaft cam 25. The zooming motor unit 35 is fixed to the first fixed lens frame unit 15 by securing with screws two securing parts (see FIG. 3) of a gear shaft fixing part 37 and a stop board fixing part 38 to an alignment hole 39 formed on the first fixed lens frame unit 15 and to a stop hole 41.

Then, an aperture/shutter unit 42 is assembled to the main fixed lens frame 22. The aperture/shutter unit 42 (see FIG. 2) comprises an aperture/shutter part 43 having an aperture which controls-the amount of passing light of reflection light forming the second optical axis O2, and a shutter, and rotary solenoids 44 and 45 which respectively drive the aperture and the shutter of the aperture/shutter part 43 in a mechanical manner.

The aperture/shutter part 43 is arranged in the position 21 of the aperture shown in FIG. 1B, and the two rotary solenoids 44 and 45 are arranged below the zooming shaft cam 25.

Furthermore, a vibration wave linear motor 46 for moving and driving the third movable lens frame 19, and a magnetic sensor unit 47 are aligned to overlay in the short side direction of the main fixed lens frame 22 below the aperture/shutter unit 42.

As a result, the vibration wave linear motor 46 is arranged in the position in the direction where the shaft of the zooming shaft cam 25 is extended, and on the side of the image capturing surface.

The magnetic sensor unit 47 (see FIG. 3) comprises a magnetic sensor holder 48, a magnetic sensor 49, a magnetic scale 51, and a pressing spring 52.

The above described vibration wave linear motor 46 and magnetic sensor unit 47 will be described in detail later.

After the above described members are arranged in this way, the first movable lens frame 17, the second movable lens frame 18, and the third movable lens frame 19, to which the movable lens units 9, 11, and 12 shown in FIG. 1B (but not shown in FIGS. 2 and 3) are respectively fixed with an adhesive, are assembled.

The top and the bottom (the top and the bottom also in FIG. 1B) of each of the lenses L3 to L8 of the movable lens units 9, 11, and 12, which are respectively held by the first movable lens frame 17, the second movable lens frame 18, and the third movable lens frame 19 and shown in FIG. 1B, for the lens apparatus 1 shown in FIG. 1A are cut, and the top and the bottom surfaces form flat surfaces, and the lenses are shaped like an oval when viewed at the front, although this is not clearly shown in FIG. 1B because it is the cross-sectional side view.

Additionally, the top and the bottom surfaces (the top and the bottom of the lens apparatus 1 shown in FIG. 1A, and the top and the bottom of the lens unit shown in FIG. 1B) along the second optical axis O2 are formed to be flat so that the circumferences of the lens holding units of the first, the second, and the third movable lens frames 17, 18, and 19 hold the oval-shaped lens. This leads to a reduction in the thickness of the movable lens frames embedded in the lens apparatus 1.

For a further reduction in the thicknesses of the second and the third movable lens frames 18 and 19, frame walls, which correspond to the flat surfaces of the bottoms of the lenses, of the bottoms (the bottom portions in FIG. 2, and the top portions in FIG. 3) of the lens frames holding the lenses are cut to form cut parts 18-1 and 19-1, which are shown in FIG. 1B, and the flat parts of the bottoms of the lenses are exposed.

The above described cut part of the second movable lens frame 18 is shown in FIGS. 2 and 3. However, the cut part of the third movable lens frame 19 is not shown because it is hidden by the remaining peripheral portion of the lens frame.

The first movable lens frame 17, the second movable lens frame 18, and the third movable lens frame 19 (see FIG. 2) respectively comprise shaft bearing parts 53 (53-1, 53-2, 53-3), in which guide holes 54 (54-1, 54-2, 54-3) are respectively provided.

Additionally, the first movable lens frame 17, the second movable lens frame 18, and the third movable lens frame 19 respectively comprise U-shaped cut parts 55 (55-1, 55-2, 55-3) at ends as opposed to the shaft bearing parts 53 (see FIG. 3).

Furthermore, a light reflecting member 59 is attached and arranged in a stage height part 58 formed in a boundary between a front outer surface 56 (see FIG. 2) as opposed to the back end portion, which has the above described shaft bearing parts 53 and the U-shaped cut parts 55, and a side surface 57 where the shaft bearing parts 53 of the first movable lens frame 17 are arranged.

Still further, cam followers 61 (61-1, 61-2) are respectively formed in a portion which is provided to protrude at the side integrally with the shaft bearing part 53-1 of the first movable lens frame 17, and in a portion which is provided to extend integrally with the shaft bearing part 53-2 of the second movable lens frame 18.

Still further, a light reflecting member 62 is attached to a side surface that is provided to be erected in the horizontal direction integrally with the shaft bearing part 53-3 of the third movable lens frame 19.

Still further, convex parts 63 (63-2, 63-3) for reinforcement, which are explained with reference to FIG. 1B, are formed on the outer surface on the front end as opposed to the back end having the shaft bearing parts 53 and the U-shaped cut parts 55.

These convex parts 63 are provided to reinforce the strengths of the lens frames, which are insufficient due to the cut wall frames corresponding to the back flat portions of the oval lenses in order for a reduction in the thickness of the entire apparatus.

Additionally, a first guide member 65, both ends of which are supported by guide member supporting holes 64 (64-1, 64-2) formed at corners respectively closest to the open side surface and the open main surface of the first fixed lens frame unit 15 and the second fixed lens frame unit 16, is inserted into guide holes 54 of the three movable lens frames.

As a result, the first, the second, and the third movable lens frames 17, 18, and 19 (namely, the 3 movable lens units 9, 11, and 12) are supported to be movable in the direction of the second optical axis O2 shown in FIG. 1B.

Furthermore, the guide member supporting holes (64-1, 64-2) supporting the first guide member 65 are formed at the corners closest to the open side surface and the open main surface, whereby the first guide member 65 is arranged to be as close as possible to an outermost portion, in which the open side surface and the open main surface join, within the lens apparatus 1 formed b the main fixed lens frame 22. The first guide member 65, which is arranged to be as close as possible to the outermost portion, is supported by the shaft bearing parts 53, whereby the 3 movable lens frames are arranged within the narrow and flat main body of the apparatus without wasting space.

When the first guide member 65 is inserted, a compressed spring 66 having pressing force is externally attached to the first guide member 65 between the shaft bearing part 53-1 of the first movable lens frame 17 and the shaft bearing part 53-2 of the second movable lens frame 18.

Additionally, a second guide member 68 is arranged by supporting its both ends with other 2 guide member supporting holes 67 (see FIG. 3) formed in positions, which are closest to the closed side surface and the open main surface configured by the metal frame 23b, of the first fixed lens frame unit 15 and the second fixed lens frame unit 16, before the 3 movable lens frames are assembled.

The respective movable lens frames are rotated inside by using the second guide member 68 as a pivot line after the above described U-shaped cut parts 55 are supported to freely slide by fitting into the second guide member 68 horizontally, whereby the cam followers 61 provided in the first movable lens frame 17 and the second movable lens frame 18 freely and smoothly penetrate into the cam grooves of the zooming shaft cam 25 to engage with, when the 3 movable lens frames are assembled.

Namely, cams (the cam grooves with which the cam followers 61-1 and 61-2 engage), which respectively correspond to a plurality of lens frames (the first movable lens frame 17 and the second movable lens frame 18 in this example) are respectively formed in the zooming shaft cam 25.

The cam followers 61 penetrate into the cam grooves of the zooming shaft cam 25 as described above, whereby the zooming shaft cam 25, and the first movable lens frame 17 and the second movable lens frame 18 engage with each other to freely slide.

Additionally, the top outer surface 56 (see FIG. 2) of the first movable lens frame 17 is arranged to be close to the back side of the metal frame 23a forming one main surface, and the convex parts 63 for reinforcement, which are formed on the front outer surfaces of the second movable lens frame 18 and the third movable lens frame 19, penetrate into an opening part 69 also formed on the metal frame 23a.

This opening part 69 forms an opening which is vertically long according to the move stroke of a movable lens in order to avoid an interference with the move of a movable lens (see the lenses L5 to L8 shown in FIG. 1B) that moves with the move of the second movable lens frame 18 or the third movable lens frame 19, namely, in order not to prevent the convex parts 63 from moving.

Hereafter, the above described first guide member 65 is inserted into the guide hole 54 of the shaft bearing parts 53 of the movable lens frames, and the guide member supporting holes 64 at both of the ends. As a result, the two guide members (65, 68) are arranged to be adjacent to the zooming shaft cam 25 and in parallel with the shaft of the zooming shaft cam 25.

As described above, the shaft members are arranged to be adjacent and in parallel, which contributes to a reduction in the size of the entire apparatus.

By being supported by the two guide members, the three movable lens frames (17, 18, 19) are controlled to be able to slide in the direction of the optical axis O2, prohibited by one of the guide members from rotating about the other, and aligned in a direction perpendicular to the optical axis O2, so that the movable lens frames are arranged within the main fixed lens frame 22.

Additionally, the compressed spring 66 is arranged between the shaft bearing part 53-1 of the first movable lens frame 17 and the shaft bearing part 53-2 of the second movable lens frame 18 by being externally attached to the first guide member 65, whereby the first movable lens frame 17 and the second movable lens frame 18 are pressed in the mutually reverse directions.

As a result, the cam followers 61-1 and 61-2, which respectively engage with the cam grooves of the zooming shaft cam 25, are respectively pressed against the opposite sides of the wall of the cam grooves of the zooming shaft cam 25. Accordingly, a play occurring between the cam grooves and the cam followers when the zooming shaft cam 25 is driven to rotate is eliminated. As a result, a position relationship when the lens frames move to the left or the right is properly controlled.

In the above described arrangement, the first guide member 65 is arranged to be adjacent and almost in parallel with the zooming shaft cam 25.

Hereafter, the image capturing element 14 is installed on the bottom surface of the second fixed lens frame unit 16. Additionally, a photosensor installment hole 71 is provided in a position, which corresponds to the light reflecting member 59 attached to the first movable lens frame 17, on the surface of the first fixed lens frame unit 15, which exists on the same surface of the metal frame 23a. A photosensor 72 is arranged in this photosensor installment hole 71.

This photosensor 72 detects the absolute position of the first movable lens frame. The move distance of the first movable lens frame from the detected absolute position is determined in a way such that the number of steps of a zoom motor of a zooming motor unit 35, which is driven in steps, is counted by a control device not shown.

Additionally, another photosensor 73 is arranged in a position, which corresponds to the light reflecting member 62 attached to the third movable lens frame 19, on a side facing the open side surface of the second lens frame unit 16. This photosensor 73 detects the absolute position of the third movable lens frame 19 by detecting the light reflected from the light reflecting member 62 attached to the third movable lens frame 19.

After these absolute positions are determined, the zooming shaft cam 25 rotates in both forward and backward directions within a predetermined angle range by means of the forward and backward rotations of the motor of the zooming motor unit 35. The cam follower 61-1 of the first movable lens frame 17, and the cam follower 61-2 of the second movable lens frame 18 respectively engage with the two cam grooves provided on the outer round surface of the zooming shaft cam 25, whereby the first movable lens frame 17 and the second movable lens frame 18 (namely, the first movable lens unit 9 and the second movable lens unit 11) move close to or apart from each other in the direction of the second optical axis O2. As a result, the image of the pencil of light proceeding in the direction of the optical axis O2 is zoomed in/out.

Additionally, the aperture/shutter unit 42, where the aperture/shutter part 43 is arranged in the aperture position 21 between the first and the second movable lens units 9 and 11 in FIG. 1B, opens/closes the course of the pencil of light proceeding in the direction of the optical axis O2, and an optical filter (ND filter) that controls the amount of light on the image capturing surface is moved forward and backward within the course of the pencil of light.

A vibration wave linear motor that drives the move of the third lens frame holding the third movable lens unit 12 for achieving a focus is described next.

<Entire Configuration of the Vibration Wave Linear Motor>

FIG. 4A is a perspective view showing the disassembly of the vibration wave linear motor used in this preferred embodiment, whereas FIG. 4B is a perspective view showing its assembled state. As shown in FIGS. 4A and 4B, the vibration wave linear motor 46 comprises a vibrator composed of a vibrator unit 75 shaped like a rectangular parallelepiped, and pluralities (respectively two in this figure) of protruding contacting parts 76 (76-1, 76-2), which are formed integrally with or separately from the vibrator unit 75 on opposed two top and bottom surfaces of the vibrator unit 75.

The vibrator unit 75 is shaped like a rectangular parallelepiped without concave and convex portions as described above, whereby the entire motor can be easily reduced in size. Additionally, the driving contacting parts 76 are comprised on the opposed two surfaces, whereby high driving force can be delivered.

The vibration wave linear motor 46 further comprises two guide members 77 (77-1, 77-2) guiding the self-running move of the vibrator 70 by sandwiching the vibrator unit 75 in parallel with the move direction via the driving contacting parts 76 of the vibrator 70, and supporting parts 78 supporting the entire vibrator while aligning the round-bar-state two guide members 77. The driving contacting parts 76 are formed to protrude respectively in the directions of the guide members 77 on their arrangement surfaces.

In the supporting part 78, fixed shaft bearing holes 79 supporting the upper guide member 77-1 among the two guide members 77 by attaching and fixing the member are formed in upper portions of erecting parts 78-2, which are formed integrally with a base part 78-1 from both ends of the base part 78-1. Under the holes 79, shaft bearing long holes 81 supporting the lower guide member 77-2 to freely move up and down are formed. In the erecting parts 78-2 of the supporting part 78, open parts 78-3 are formed at the side of supporting the two guide members 77.

Additionally, at the bottom surface in the neighborhoods of both of the ends of the base part 78-1 of the supporting part 78, convex parts 82 are respectively provided in positions, which correspond to both of the ends of the lower guide member 77-2 inserted in the shaft bearing long holes 81. The convex parts 82 are hollow when viewed from upward although this is not shown, and spiral (coil) springs 83 having pressing force are held in the hollow portions.

Furthermore, the top ends of the spiral springs 83, which protrude upward from the hollow portions, press the lower guide member 77-2 in the neighborhoods of both of its ends, namely, toward the upper guide member 77-1. As a result, the lower guide member 77-2 is pressed against the driving contacting parts 76 on the bottom surface of the vibrator 70, which the lower guide member 77-2 sandwiches along with the upper guide member 77-1, and supported by the shaft bearing long holes 81 to be movable up and down by means of a vibration of the vibrator 70, which will be described later, and the pressing force of the spiral springs 83.

The lower guide member 77-2 is supported by the shaft bearing long holes 81 to be movable up and down as described above, whereby an assembly error between the guide members 77 can be easily absorbed, and the entire apparatus can be easily reduced in size.

Additionally, the lower guide member 77-2 is pressed with the spiral springs 83 in the neighborhoods of both of the ends of the lower guide member 77-2, whereby the lower guide member 77-2 can be evenly pressed against the vibrator 70 over the entire proceeding direction of the vibrator 70. Accordingly, the driving contacting parts can be stably pressed against the guide members 77 all the time in whichever position the vibrator exists. As a result, the stable forward and backward move of the vibrator 70 can be implemented.

Here, the upper and the lower guide members are referred to as the two guide members 77. However, the lower guide member 77-2 may be an upper guide member depending on a position relationship when being assembled in the lens apparatus 1. Or, if the lens apparatus 1 is rotated from the state shown in FIG. 1B, the two guide members 77 may be the left and the right members, or front and back members.

Furthermore, the pressing members, which press the neighborhoods of both of the ends of the lower guide member 77-2 in the direction of the upper guide member 77-1, are not limited to the spiral springs 83. Board springs, magnets, etc. may be available. Additionally, the lower guide member 77-2 is not limited to being pressed in the direction of the upper guide member 77-1 with the pressing force, and may be drawn in the direction of the upper guide member 77-1 with drawing force.

Next, drop preventing pins 84 are arranged by making the pins abut on both of the ends of the lower guide member 77-2 that is inserted into the shaft bearing long holes 81 in order to prevent the lower guide member 77-2, which can freely move up and down, from dropping or falling away. Both ends of the drop preventing pins 84 are adhered and secured to pin fixing grooves 85 formed on the outer surface of the shaft bearing long holes 81. The lower guide member 77-2 is prevented from dropping or falling away by the above described drop preventing pins 84, and its reaction move when the vibrator 70 makes a reverse move is restricted.

The above described vibrator 70 moves forward and backward between the erecting parts 78-2 at both of the ends in a direction in parallel with the guide members 77-1 and 77-2, which is indicated by a bidirectional arrow b shown in FIG. 4B, with a specific vibration to be described later, and the operations of the driving contacting parts 76 and the two guide members 77-1 and 77-2.

In the above described driving contacting parts 76, concave cut parts, which have various shapes, for being properly guided (or restricted) by the first and the second guide members 77 are provided on surfaces contacting the first and the second guide members 77. As a result, the move direction of the vibrator 70 is restricted to only a direction along the first or the second guide member 77 via the driving contacting parts 76, although details will be described later.

As described above, the guide members 77 forming the move path of the vibrator 70 restrict also the move direction of the vibrator 70 via the driving contacting parts 76. Additionally, since 3 or more driving contacting parts 76 are arranged, also the rotation of the vibrator 70 on a plane space formed by the first and the second guide members 76 and 77 is restricted. This eliminates the need for providing a rotation stopper of the vibrator 70, thereby simplifying the configuration.

In the vibration wave linear motor 46 which is shown in FIG. 4B and referred to in this embodiment, the vibrator 70 self-runs along the two guide members 77 as described above. However, for example, if a member sandwiching both of the ends of the vibrator 70 in the move direction is arranged and fixed to a frame, the supporting part 78 that supports the two guide members 77 is to move, and the vibrator 70 and the two guide members 77 have a relationship of a relative move. This will be described in detail later.

<Configuration of the Vibrator>

Figures 5A, 5B:
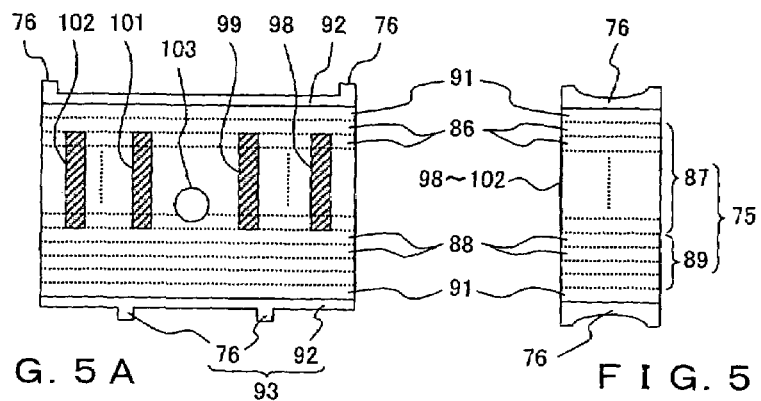
FIG. 5A is a front view of a vibrator of a vibration wave linear motor.
FIG. 5B is a side view of the vibrator shown in FIG. 5A.
Figure 5C:
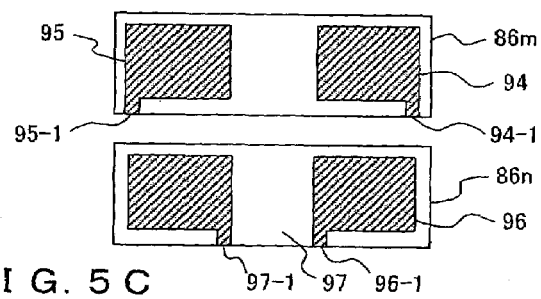
FIG. 5C shows an arrangement of piezoelectric sheets and electrodes of the vibrator shown in FIGS. 5A and 5B.
Figures 5D, 5E:
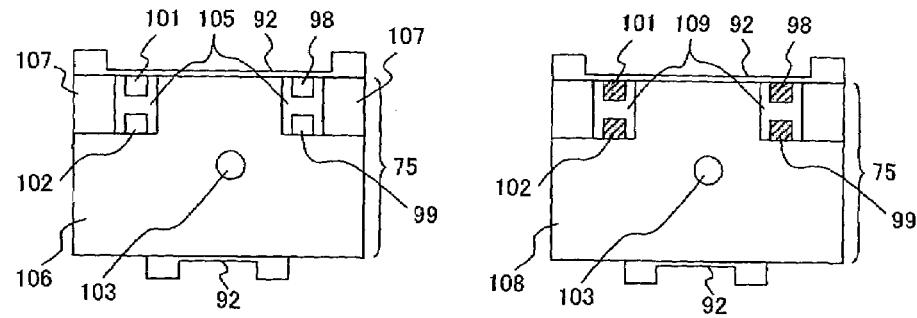
FIGS. 5D and 5E are schematics exemplifying two other configurations of the vibrator of FIGS. 5A–5C.
Figure 5F:
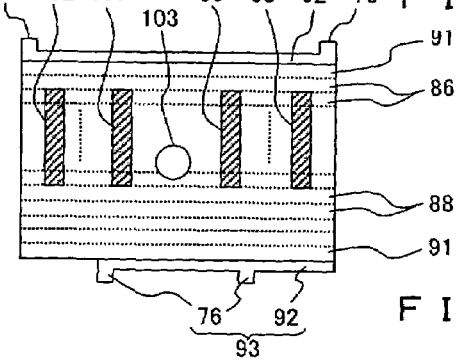
FIG. 5F ia a schematic exemplifying another form of coupled driving contacting parts.

FIG. 5A is a front view of the vibrator 70 of the above described vibration wave linear motor 46. FIG. 5B shows its side view. FIG. 5C shows an arrangement of piezoelectric sheets and electrodes of the vibrator 70 shown in FIGS. 5A and 5B. FIGS. 5D and 5E are schematics exemplifying two other configurations of the vibrator. FIG. 5F is a schematic exemplifying another form of coupled driving contacting parts.

FIGS. 5A and 5B show the vibrator 70 by turning the vibrator 70 shown in FIGS. 4A and 4B upside down. FIGS. 4A and 4B also show electrodes, which are wired to the vibrator unit 75 and not shown in FIGS. 4A and 4B.

As shown in FIGS. 5A and 5B, the vibrator 70 comprises: the vibrator unit 75 configured by a piezoelectric sheet layer 87 composed of stacked piezoelectric sheets 86, and an elastic sheet layer 89 composed of elastic sheets 88 stacked below the piezoelectric sheet layer; and pluralities (a total of 4 units in this example) of driving contacting parts 76 respectively arranged on two opposed surfaces in the stacking direction of the piezoelectric sheets 86 of the vibrator unit 75.

The above described vibrator unit 75 is manufactured by annealing the stacked piezoelectric sheets 86 and elastic sheets 88, and by performing poling.

Insulation sheets 91 are respectively attached to the top surface of the piezoelectric sheet layer 87 and the bottom surface of the elastic sheet layer 89. As an insulation sheet 91, the same member as an elastic sheet 88, which is originally an insulation material, may be available.

The above described driving contacting parts 76 are respectively formed by being made to closely contact the outside surfaces of the insulation sheets 91. Additionally, the respective 2 driving contacting parts 76 are formed not alone but integrally with a flat board part 92 configured by a board member, so that the two driving contacting parts 76 form a coupled driving contacting part 93 (not the whole but the two driving contacting parts 76 form a contacting unit). Note that the coupled driving contacting part 93 is formed separately from the vibrator unit 75.

The driving contacting parts 76 are formed as a coupled driving contacting part 93 as described above, whereby the efficiency of assembly can be increased in comparison with a case where a plurality of driving contacting parts 76 are separately assembled. However, it is not always necessary to configure the driving contacting parts 76 as the coupled driving contacting parts 93 on both of the surfaces. Configuring only one coupled driving contacting part 93 with driving contacting parts on either of the surfaces can contribute to improvements in the efficiency of assembly.

Preferably, the coupled driving contacting part 93 is made of a resinous material obtained by scattering and solidifying abrasive grains such as alumina powder, etc. Since the acoustic impedance of this material is lower than those of the other portions of the vibrator 70, most parts other than the coupled driving contacting part and close to a longitudinal vibration or a flexion vibration, which will be described later, are excited, leading to the facilitation of design.

Furthermore, a material having both hardness and elasticity is selected as the material of the coupled driving contacting part 93, whereby the part can be easily made to vibrate along with the vibrator unit 75, and its abrasion resistance is improved. This contributes to improvements in the durability of the vibration wave linear motor 46.

Additionally, preferably, the size of the flat board part 92 of the coupled driving contacting part 93 is formed to match the surface of the vibrator unit 75 (it is preferable that the surfaces of the coupled driving contacting part 93 and the vibrator unit 75, which are attached to each another, are identical in shape and size. Namely, it is preferable that the bottom surface of the coupled driving contacting part 93 is the same as that of the vibrator unit, to which the coupled driving contacting part 93 is to be attached).

In this way, alignment is facilitated when the coupled driving contacting part 93 is attached to the vibrator unit 75, thereby improving the efficiency of assembly operations. If only one end of the flat board part 92 (coupled driving contacting part 93) is aligned with one end of the surface of the vibrator unit 75 like the lower coupled driving contacting part 93 on the bottom surface shown in FIG. 5F, this can also achieve the same effect.

The piezoelectric sheet layer 87 of the vibrator unit 75 configures a piezoelectric unit for mainly giving a forcible vibration, whereas the elastic sheet layer 89 configures an exciting unit for exciting particular vibration mode along with the piezoelectric unit. However, if desired vibration mode can be excited only with the piezoelectric unit, the exciting unit is not always required.

The piezoelectric sheets 86 forming the piezoelectric sheet layer 87, and the elastic sheets 88 forming the elastic sheet layer 89 are originally, for example, thin rectangular sheet members made of the same material such as PZT (titanic acid lead zirconate), etc. except whether or not an internal electrode process shown in FIG. 5C is executed. Specifically, each of the sheets is, for example, 10 mm (length) by 2.5 mm (width) by 80 µm (height) (thickness in the stacking direction) in size.

As the PZT material used in this embodiment, a hard material having a Qm value as large as 2000 is selected and used. The same material is used also as an elastic sheet. Additionally, the insulation sheets 91 which sandwich the piezoelectric sheet layer 87 and the elastic sheet layer 89 are made of the same PZT material having a thickness of 40 µm. Although these insulation sheets are made of the same material as that of the piezoelectric sheets, electrodes are not provided thereon. Therefore, the insulation sheets are not polarized and have no piezoelectricity, and actually have a characteristic as an insulation material.

The piezoelectric sheets 86 of the piezoelectric sheet layer 87 are configured by two types of sheet-state piezoelectric elements only having different electrode patterns for which the internal electrode process is executed. One of the two types of the piezoelectric sheets 86 is a piezoelectric sheet 86m partitioned into right and left portions, in which A+ internal electrode foil 94 and B− internal electrode foil 95 are formed, on an entire surface as shown in FIG. 5C. For the A+ internal electrode foil 94 and the B− internal electrode foil 95, terminals 94-1 and 95-1, which are intended to make an external connection, are respectively formed to protrude toward one side of the piezoelectric sheet 86m in positions close to both of the right and left ends.

The other type is a piezoelectric sheet 86n similarly partitioned into right and left portions, in which A− internal electrode foil 96 and B+ internal electrode foil 97 are formed, almost on an entire surface. For the A− internal electrode foil 96 and the B+ internal electrode foil 97, terminals 96-1 and 97-1, which are intended to make an external connection, are formed to protrude toward one side, which is the same as the sheet 86m, of the piezoelectric sheet 86n in positions close to the center between the right and the left portions.

For the above described internal electrode foils, silver-palladium alloy or silver is used as their electrode material. The electrode foils are formed to have a thickness of 4 μm, for example, with vapor deposition and a photolithography technique.

In this preferred embodiment, the piezoelectric sheet layer 87 is configured by alternately stacking these two types of piezoelectric sheets 86m and 86n as a total of 48-sheet layers composed of respective 24 sheets.

In this way, in a middle portion except for the topmost and the bottommost portions, the internal electrodes for applying voltages having reverse potentials to both of a piezoelectric sheet 86 (86m or 86n), on which internal electrode foils are formed, and a piezoelectric sheet 86 (86n or 86m), which the internal electrode foils themselves contact.

The terminals 94-1, 95-1, 96-1, and 97-1, which are formed to protrude toward one side of the piezoelectric sheet 86 (86m, 86n) from the above described A+ internal electrode foil 94, A− internal electrode foil 97, B+ internal electrode foil 97, and B− internal electrode foil 95 and are intended to make an external connection, are respectively connected to an A+ electrode connecting external terminal 98, an A− electrode connecting external terminal 99, a B+ electrode connecting external terminal 101, and a B− electrode connecting external terminal 102, which are made of baked silver, on one side surface (one of two side surfaces that are parallel to the two guide members 77 shown in FIGS. 4A and 4B and do not face the guide members 77) of the vibrator unit 75 shown in FIG. 5A.

The A+ electrode connecting external terminal 98 and the A− electrode connecting external terminal 99 are configured as A phase electrodes, whereas the B+ electrode connecting external terminal 101 and the B− electrode connecting external terminal 102 are configured as B phase electrodes. In this case, the A− electrode connecting external terminal 99 and the B− electrode connecting external terminal 102 are configured for connecting to A phase and B phase grounds (GNDs). Therefore, these terminals may be configured to have the same electric potential by connecting to the same lead wire, etc. in this case.

A voltage is applied from a driving circuit to be described later to the piezoelectric sheet layer 87 via these A phase and B phase electrode connecting external terminals, so that the vibrator unit 75 generates ultrasonic elliptical vibrations to be described later.

The vibrator unit 75 in this preferred embodiment is configured, for example, to be 10 mm (length) by 2 mm (width) by 2.5 mm (height) in size. In this vibrator unit 75, a pin member installment hole 103, which is not shown in FIGS. 4A and 4B, is formed almost in the middle of the A phase and the B phase electrodes, namely, almost in a central part of the vibrator unit 75. The pin member installment hole 103 will be described later.

Additionally, the piezoelectric unit is not limited to the piezoelectric sheet layer 87. For example, the following configuration may be available. FIG. 5D shows the configuration as a piezoelectric unit, where coupled driving contacting parts 93 are attached to a vibrator unit, which is obtained by adhering and linking piezoelectric units 105 composed of stacked layer piezoelectric units or piezoelectric elements, a vibrator unit principal part 106 made of, for example, brass, and vibrator unit components 107. The vibrator unit principal part 106 and the vibrator unit components 107 configure an exciting unit.

FIG. 5E shows a configuration where thin single board piezoelectric units 109 and coupled driving contacting parts 93 are attached to a rectangular-parallelepiped-shaped elastic part 108 made of, for example, brass. The elastic part 108 configures an exciting unit. Attaching these parts by applying sufficient pressure when the parts are attached is vital to increase vibration transmission efficiency.

<Principle of Driving>

FIG. 6 shows a driving circuit driving and controlling a vibration wave linear motor 46 having the above described configuration. The driving circuit 110 shown in this figure is mounted along with an AF (Auto Focus) circuit 109 on the circuit board 2 shown in FIG. 1A.

Upon receipt of any of forward and backward instruction signals along with any of move and stop instruction signals from the AF circuit 109, a CPU (Central Processing Unit) 111 of the driving circuit 110 outputs a corresponding signal to an oscillation circuit 112 and a 900 phase circuit 113.

Upon receipt of the move signal, the oscillation circuit 112 applies an ultrasonic driving voltage to the A phase electrodes 98 and 99 of the vibration wave linear motor 46 via an amplifier 114-1, and outputs the same ultrasonic driving voltage to the 90° phase circuit 113.

The 90° phase circuit 113 shifts the phase of the frequency of the ultrasonic driving voltage input from the oscillation circuit 112 by +90° or −90° based on the forward or backward instruction signal received along with the move signal from the CPU 111, and applies the voltage to the B phase electrodes 101 and 102 of the vibration wave linear motor 46 via another amplifier 114-2.

As a result, the vibration wave linear motor 46 self-runs in a predetermined direction as will be described later by making an ultrasonic vibration, and moves the third movable lens frame 19 in a predetermined direction along with the optical axis O2.

As described above, the absolute position of the third movable lens frame 19 is detected in advance by the reflector (light reflecting member 62) and the photosensor 73 of a reflection type. The detected absolute position is notified to the CPU 111.

In the meantime, the move amount of the third movable lens frame 19 is detected in a way such that the magnetic sensor reads the magnetic scale of the magnetic sensor unit 47. A pulse signal, which indicates the move amount read by the magnetic sensor, is output to a counter 115 via an amplifier 114-3. The counter 115 measures the pulse signal indicating the move amount, and outputs a measurement result to the CPU 111.

The CPU 111 recognizes the current position of the third movable lens frame 19 based on the absolute position of the third movable lens frame 19, which is input from the photosensor 73, and the measurement result of the move amount, which is input from the counter 115, and notifies the AF circuit 109 of the recognized current position of the third movable lens frame 19. The CPU 111 stops the output of the oscillation circuit according to the stop signal from the AF circuit 109.

FIGS. 7A and 7B are perspective views schematically explaining ultrasonic elliptical vibrations of the vibrator unit 75 of the vibration wave linear motor 46 that is oscillated and driven as described above.

Firstly, if an alternating current voltage having the same phase in the neighborhood of a frequency 160 kHz is applied to the A phase electrodes 98 and 99 and the B phase electrodes 101 and 102 of the vibrator unit 75 shown in FIG. 5A, a primary longitudinal vibration is excited in the vibrator unit 75. Or, if an alternating current voltage having a reverse phase in the neighborhood of the frequency 160 kHz is applied to the A phase electrodes 98 and 99 and the B phase electrodes 101 and 102, a secondary flexion vibration is excited in the vibrator unit 75.

These vibrations were analyzed with a finite element method by using a computer, so that a resonant longitudinal vibration posture shown in FIG. 7A, and a resonant flexion vibration posture shown in FIG. 7 were respectively expected. Results of the supersonic vibration measurement proved these expectations.

In this preferred embodiment, the resonant frequency of the secondary flexion vibration is designed to be lower than that of the primary longitudinal vibration by several percent (preferably 3 percent or so). With such a configuration, the output characteristic as the vibration wave linear motor can be significantly improved as will be described later.

Next, by applying an alternating current voltage having a phase different by $\pi/2$ in the neighborhood of 160 kHz to the A phase electrodes 98 and 99 and the B phase electrodes 101 and 102 of the vibrator unit 75, an elliptical vibration can be observed in the positions of the driving contacting parts 76 of the vibrator 70.

In this case, the direction of the rotation of the elliptical vibration caused by the supersonic vibration in the positions of the driving contacting parts 76 arranged on the bottom surface of the vibrator 70, and that of the rotation of the elliptical vibration caused by the supersonic vibration in the positions of the driving contacting parts 76 arranged on the top surface become reverse.

Additionally, if the resonant longitudinal vibration and the resonant flexion vibration, which are respectively shown in FIGS. 7A and 7B, are further analyzed, in the resonant longitudinal vibration, an expansion and contraction vibration caused by a repetition of contraction and expansion respectively appear in the vertical and horizontal directions vertically and horizontally in the short side direction in correspondence with an expansion and contraction vibration of the vibrator unit in the long side direction shown in FIG. 7A. This phenomenon becomes more conspicuous toward the middle portion c of the vibrator unit. For the sake of explanation, if the expansion and contraction vibration caused by the contraction and expansion of the vibrator unit only in the vertical direction in the short side direction is represented, the vibration is made in a range of an expansion and contraction width dh shown in FIG. 7A.

In the resonant flexion vibration, a vibration like a pendulum appears in a range of a width dw in the long side direction of the vibrator unit in the middle portion c of the vibrator unit in correspondence with the flexion vibration in the vertical direction in the short hand direction of the vibrator unit, which is shown in FIG. 7B.

The vibration in the expansion and contraction width dh in the vertical direction, and the vibration like a pendulum in the width dw in the long side direction cause an elliptical vibration also in the middle portion c. A cycle of the elliptical vibration in the middle portion c has a shift of approximately 90° from the cycle of the elliptical vibration of the above described driving contacting part 76 (see FIG. 5) at the end in the long side direction or closer to the middle portion.

FIGS. 8A to 8F schematically show the elliptical vibrations of the driving contacting parts of the vibrator when alternating current voltages having different phases are respectively applied. In FIGS. 8A to 8F, the starting and end points of a circular arrow indicated for a driving contacting part 76 respectively indicate the starting and end points of the cycle of the elliptical vibration of the driving contacting part 76, which corresponds to the starting and end point of the phase of an applied voltage.

Figure 8A:
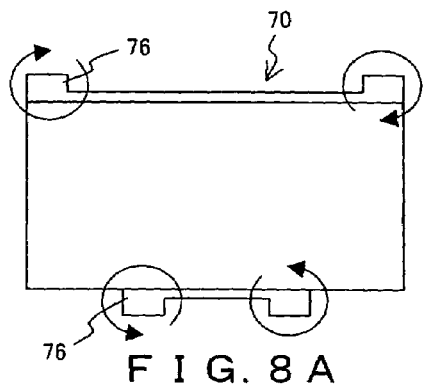
FIGS. 8A to 8F are schematics showing the elliptical vibrations of the driving contacting parts of the vibrator when alternating current voltages having different phases are respectively applied.
Figure 8C:
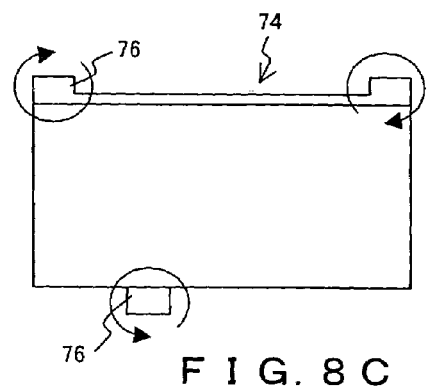
Figure 8B:
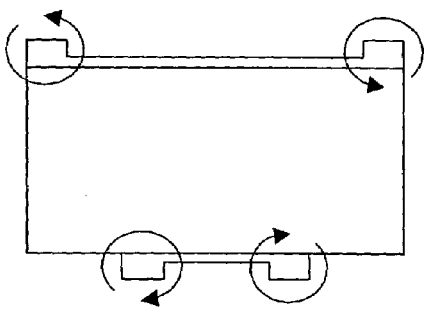

FIGS. 8A and 8B schematically show the elliptical vibrations of the driving contacting parts of the vibrator 70 when an alternating current voltage having a phase different by $\pi/2$ in the neighborhood of 160 kHz is applied. FIG. 8A shows operations performed when the phase of the alternating current voltage, which is applied to the A phase electrodes 98 and 99 shown in FIG. 5A, is behind by $\pi/2$ from the phase of the alternating current voltage, which is applied to the B phase electrodes 101 and 102. In this figure, the driving contacting parts 76 on the bottom surface of the vibrator 70 rotate in a counterclockwise direction, whereas the driving contacting parts 76 on the top surface rotate in a clockwise direction.

As described above, the driving contacting parts 76 on the top and the bottom surfaces are respectively arranged in positions where the elliptical vibrations in different directions appear, whereby driving force in the same direction occurs in the vibrator 70.

FIG. 8B shows operations performed when the phase of the alternating current, which is applied to the A phase electrodes 98 and 99, is ahead by $\pi/2$ from the phase of the alternating current voltage applied to the B phase electrodes 101 and 102. In this figure, the driving contacting parts 76 on the bottom surface of the vibrator 70 rotate in the clockwise direction, whereas the driving contacting parts on the top surface rotate in the counterclockwise direction. The direction of the driving force occurring in the vibrator 70 in this case becomes reverse to that in the case shown in FIG. 8A.

Figure 8D:
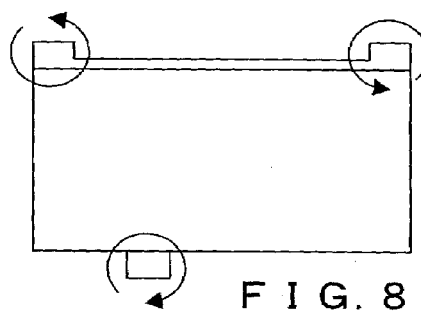

FIGS. 8C and 8D respectively show an arrangement example of 3 driving contacting parts 76 in the vibrator configured to comprise 3 driving contacting parts. In these examples, only one driving contacting part 76 is left on the bottom surface by removing the driving contacting part 76 on the right side of the lower coupled driving contacting part shown in FIGS. 8A and 8B.

An internal configuration of the vibrator 74 shown in FIGS. 8C, 8D, 8E, and 8F is the same as that of the vibrator 70 exemplified in FIGS. 5A to 5F.

Also in the cases shown in FIGS. 8C and 8D, the upper left driving contacting part 76 makes an elliptical vibration, which rotates in the same cycle in the same direction and whose phase is behind/ahead by $\pi/2$ from the phase of the elliptical vibration of the upper right driving contacting part 76. The upper left driving contacting part 76 and the one lower left driving contacting part 76 respectively make elliptical vibrations that rotate in the same cycle and in reverse directions. As a result, driving force caused by the 3 driving contacting parts 76 in the same direction occurs in the vibrator 74 also in this case.

Figure 8E:
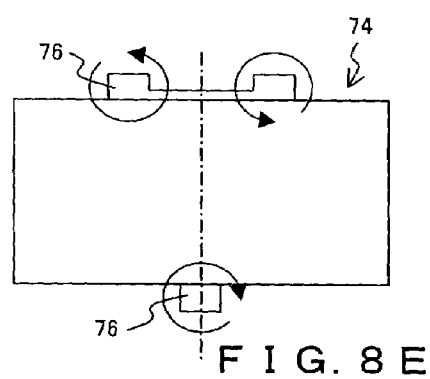
Figure 8F:
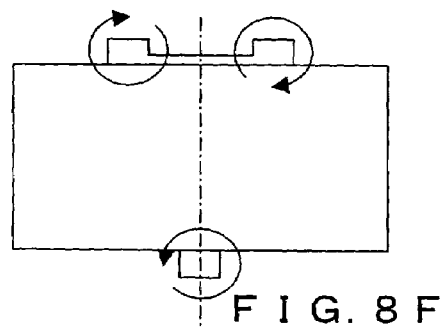

FIGS. 8E and 8F show other arrangement examples of the 3 driving contacting parts 76 in the vibrator 74 configured to comprise the 3 driving contacting parts in a similar manner as in the above described cases. In these cases, the vibrator 70 shown in FIGS. 8A and 8B is turned upside down, and only one driving contacting part 76 is provided in the middle as a replacement for the lower coupled driving contacting part having a wide interval.

In these cases, if the phase of an alternating current voltage to be applied to the vibrator 74 is behind or ahead by π/4 and applied, suitable driving force can be generated by the 3 driving contacting parts 76.

As described above, the elliptical vibrations obtained by synthesizing the longitudinal vibration and the flexion vibration of the vibrator 75, which are shown in FIGS. 7A and 7B, act on the two guide members 77 shown in FIGS. 4A and 4B via the 4 or the 3 driving contacting parts 76, and the vibrator unit 75 moves forward and backward along the two guide members 77 between both of the erecting parts 78-2 of the supporting part 78 as a counteraction. This is the operational principle of the vibration wave linear motor according to the present invention.

In this preferred embodiment, the piezoelectric unit is configured by two portions such as the A phase where the A phase electrodes 98 and 99 are arranged, and the B phase where the B phase electrodes 101 and 102 are arranged. However, the piezoelectric unit is not limited to 2. 3 or more portions may be used as far as they can generate the longitudinal vibration and the flexion vibration.

Additionally, the vibrator 70 (or 74) is shaped almost like a rectangular parallelepiped. In such a case, the above described driving force is obtained with the longitudinal and the flexion vibrations. However, the vibrator may have another shape. Besides, similar vibrations can be obtained also by simultaneously exciting one or a plurality of modes of frequencies that are identical or of an integral multiple.

Furthermore, it is preferable that the driving contacting parts are arranged in arbitrary positions where the output characteristic of the highest level can be obtained as the vibration wave linear motor, namely, positions where ultrasonic elliptical vibrations of the highest level of the vibrator 70 are made. Normally, however, since making an elliptical vibration becomes the source of driving, an elliptical vibration occurs in at least one or more driving contacting parts. Therefore, the driving contacting parts may be arranged so that the total sum of driving force caused by a vibration that occurs in the positions of all of the driving contacting parts does not become zero.

Furthermore, it is unnecessary that an elliptical vibration occurs in positions of all of driving contacting parts. Even if a single vibration or a vibration in a reverse direction occurs, it does not matter as far as the total sum of driving force from the driving contacting parts becomes not zero but driving force in one direction.

<Configuration of a Linked Part>

A configuration where forward and backward moving force of the vibrator 70, which is caused by the above described elliptical vibrations, along the two guide members 77 within the vibration wave linear motor 46, is taken out as the move driving force of the third movable lens frame 19 is described next.

Figure 9A:
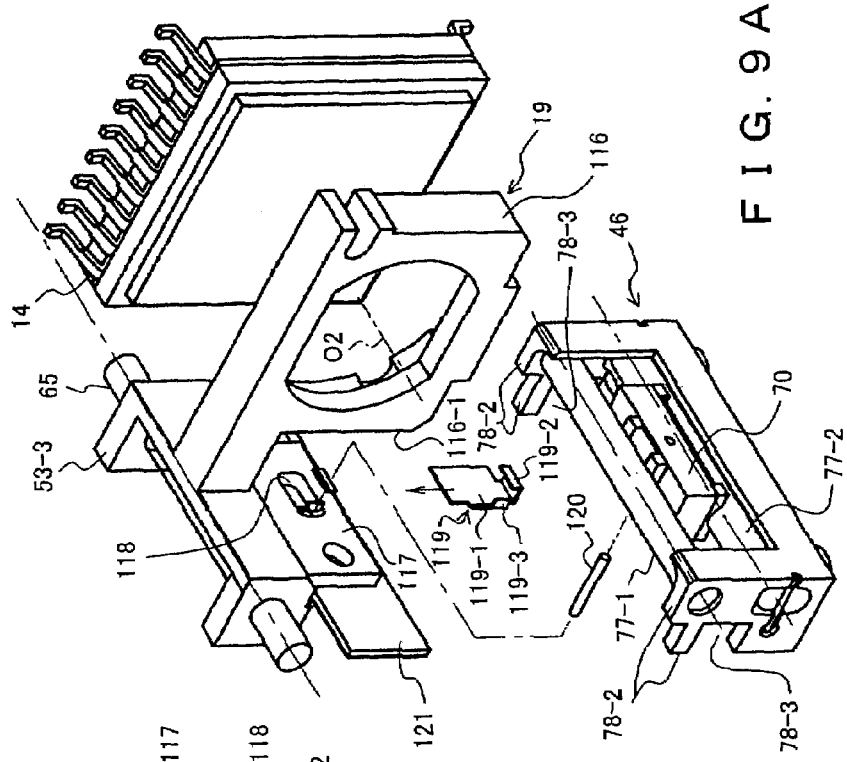
FIG. 9A is a perspective view explaining a method linking the vibration wave linear motor and a third movable lens frame.
Figure 9B:
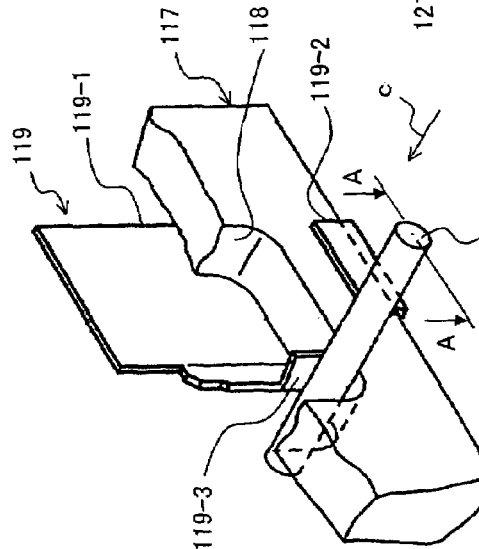
FIG. 9B is an enlarged perspective view showing only the linked portion.
Figure 9C:
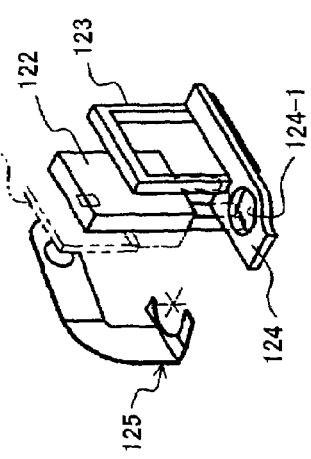
FIG. 9C is an enlarged view showing a magnetic sensor unit detecting the move amount of the third movable lens frame.

FIG. 9A is a perspective view explaining a method linking the above described vibration wave linear motor 46 and the third movable lens frame 19. FIG. 9B is an enlarged perspective view showing only the linked part. FIG. 9C is an enlarged view showing the magnetic sensor unit detecting the move amount of the third movable lens frame 19.

FIG. 10A is a schematic showing FIG. 9B when viewed in a direction of an arrow c. FIG. 10B is a cross-sectional view of FIG. 9B when taken along an arrow line A–A'.

FIG. 9A is a schematic showing the vibration wave linear motor 46 and the third movable lens frame 19 in FIG. 3. Additionally, this figure shows a pin member 120 for taking out a move output, which is fixed by being inserted into the inside from the pin member installment hole 103 shown in FIGS. 5A, and 5D to 5F in the center on the surface, where the pin is fixed, at an obliquely upper left on the other side of the vibrator 70, and is pulled out on the side, where the pin is fixed, for ease of understanding.

As shown in FIG. 9A, the third movable lens frame 19 is configured by the lens frame main unit 116 holding the third movable lens unit 12, a shaft bearing part 53-3, and an engaging protruding part 117 provided to protrude downward from the shaft bearing part 53-3. A long hole 118, which extends in a direction parallel with the direction where the lens frame main unit 116 moves along the optical axis O2, is provided almost in a central portion of the engaging protruding part 117.

In the long hole 118 (see also FIGS. 10A and 10B), a board spring 119, which presses the portion (the long hole 118 of the engaging protruding part 117) where the pin member 120 for taking out a move output abuts on the third movable lens frame 19, is engaged from the far side in this figure.

The board spring 119 is configured by a flat main part 119-1, an engaging part 119-2 bent in two stages toward the front and then upward from the bottom of the main part 119-1, and a pressing part 119-3 bent toward the front from the left end of the main part 119-1.

For this board spring 119, its engaging part 119-2 engages with the engaging protruding part 117 by wrapping the bottom of the engaging protruding part 117, where the long hole 118 of the third movable lens frame 19 is formed, from the far side. As a result, the main part 119-1 of the board spring 119 closely contacts with the long hole 118 on the far side, and the pressing part 119-3 is inserted in a predetermined position within the long hole 118 from the far side.

Between the pressing part 119-3 and the left end of the long hole 118, a gap in which the pin member 120 for taking out a move output is inserted is formed.

Between a side surface 116-1 on the opposite side of the lens frame main unit 116 of the third movable lens frame 19 and a surface on the near side of the engaging protruding part 117, a clearance for arranging the vibrator 70 of the vibration wave linear motor 46, and the flexible board that is connected to the A+ electrode connecting external terminal 98, the A− electrode connecting external terminal 99, the B+ electrode connecting external terminal 101, and the B− electrode connecting external terminal 102 of the vibrator 70, which are shown in FIG. 5 is formed.

When the vibration wave linear motor 46 is arranged in this clearance, the pin member 120 for taking out a move output is inserted in the gap formed between the pressing part 119-3 and the left end of the long hole 118 as shown in FIG. 9B.

With this engagement, the movements of the pin member 120 for taking out a move output in the direction of the second optical axis O2 are prohibited within the long hole 118, and the pin member 120 faithfully transmits the move of the vibrator 70 of the vibration wave linear motor 46, which is arranged by being fixed to the metal frame 23a not shown in FIG. 9A, in the direction of the optical axis O2 to the third movable lens frame 19.

Additionally, for the pin member 120, a play is allowed in its upward and downward movements in the above described engagement. This play absorbs a positional deviation, etc. when the vibrator 70 and the two guide members 77 (77-1, 77-2) are installed.

Furthermore, the pin member 120 for taking out a move output accurately transmits the direction and the force of the move of the vibrator 70 in the direction of the second optical axis O2 to the third movable lens frame 19 as described above. In the meantime, the pin member 115 absorbs the upward and downward movements of the vibrator 70, which are caused by the elliptical vibration of the vibrator 70, etc., with the upward and downward movements within the long hole 118, and does not transmit to the third movable lens frame 19.

As described above, as the linkage between the vibrator 70 and the third movable lens frame 19, a linked state implemented with the pin member 120 for taking out a move output, which is fixed to the vibrator 70 and only abuts on the portion (the long hole 118 of the engaging protruding part 117) of the third movable lens frame 19 with the pressing force of the board spring 119, is formed. As a result, the moving force (driving force) of the vibrator 70 is transmitted to the move of the third movable lens frame 19.

As described above, the pin member 120 is a move driving transmitting means for transmitting the move driving force of the vibrator 70 to an outside (a move driving mechanism within an electronic appliance, a member to be driven to move within a device) when the vibration wave linear motor 46 is comprised in the electronic appliance, device, etc.

Additionally, in this preferred embodiment, the pin member 120 for externally taking out the moving force of the vibrator 70 (driving force of the driving contacting parts 76) is arranged by being fixed to the central part of the vibrator 70, namely, a section common to the primary longitudinal vibration and the secondary flexion vibration (neighborhood of a stationary point in each of the vibration modes). Even if another vibration mode or a synthesis of vibration modes is used as the vibration mode of the vibrator, the pin member 120 is arranged in a section common to the vibration modes, or a portion where the vibration becomes minimal, whereby the moving force of the vibrator can be transmitted to a member to be moved without impeding the vibration of the vibrator.

In the meantime, in the vibration wave linear motor 46 in this preferred embodiment shown in FIG. 4B, the vibrator 70 and the two guide members 77 were described to have a relationship of a relative move. If this relative move is described with reference to FIG. 9, the vibrator 70 which self-runs with reference to the fixed supporting part 78 moves the third movable lens frame 19 linked to the vibrator 70 in the case of FIG. 9. Assume a configuration where both of the ends of the vibrator 70 in the move direction are sandwiched by an elastic member which does not prevent the vibration of the vibrator 70, this elastic member is fixed to the metal frame 23a, and a supporting part supporting the two guide members 77 is formed in a suitable position of the third movable lens frame 19.

With such a configuration, the vibrator 70 is arranged by being fixed, and the two guide members 77 which are driven by the driving contacting parts 76 of the vibrator 70 are moved. Namely, the third movable lens frame 19 linked to the two guide members 77 moves.

Such a configuration can be also implemented. Accordingly, the description that the vibrator 70 and the two guide members 77 have a relationship of a relative move was provided. However, the following description sometimes states that the vibrator 70 self-runs along the two guide members 77 based on the configuration shown in FIG. 9.

<Detection of a Move Amount>

In the linked configuration shown in FIG. 9 (9A and 9B), one end, which is not shown by being hidden, of the magnetic scale 121 of the magnetic sensor unit 47 is arranged by being fixed to the engaging protruding part 117 on the far side of FIG. 9 (9A and 9B), and the magnetic sensor 122 of the magnetic sensor unit 47 is arranged by being fixed to the metal frame 23a, which is not shown in FIG. 9A, in a position as opposed to the other end, which is shown, of the magnetic scale 121.

The magnetic sensor 122 is arranged by being fixed to the metal frame 23a in a way such that the magnetic sensor 122 is fit into the sensor holding frame 123, and a fixing board 124 fixing the sensor holding frame 123 is fixed to the metal frame 23a with a fixing hole 124-1. Additionally, a board spring member 125 pressing the magnetic scale 121 in the direction of the magnetic sensor 122 is simultaneously arranged by being fixed. Additionally, a board spring member 125, which presses the magnetic scale 121 in the direction of the magnetic sensor 122, is simultaneously arranged by being fixed.

FIG. 11 is a perspective view showing a partial disassembly of the detailed configuration of the magnetic sensor unit 47 shown in FIGS. 2 and 3 along with the vibration wave linear motor 46 in which the magnetic sensor unit 47 is assembled, and the third movable lens frame 19.

The magnetic sensor unit 47 is arranged to detect the move distance of the third movable lens frame 19 from an absolute position after the photosensor 73 shown in FIG. 2 detects the absolute position of the third movable lens frame 19.

As shown in FIG. 11, the above described vibration wave linear motor 46 is arranged between the side surface (the side surface opposite to the side surface on which the U-shaped cut part 55-3 exists) of the lens frame main unit 116 of the third movable lens frame 19 and the engaging protruding part 117 as described with reference to FIG. 9. This vibration wave linear motor 46 is fixed to the metal frame 23a along with the magnetic sensor holder 126 (the sensor holding frame 123 and the fixing board 124).

The fixing board 124 of the magnetic sensor holder 126 is configured to engage with an engaging part 125-1 of the board spring 125, and the sensor holding frame 123 of the magnetic sensor holder 126 holds the magnetic sensor 122.

A detecting unit 122-1 for detecting magnetism is formed almost in the central part of the magnetic sensor 122. Additionally, 4 electrode lead wires 128 whose electric connections to the magnetic sensor 122 are reinforced with an adhesive 127 are drawn from the top of the detecting unit 122-1.

Additionally, an engaging part 121-1 of the magnetic scale 121 is attached to a scale holding part 117-1 which forms a flat part by extending outside (obliquely lower right direction in FIG. 11) with a predetermined step height from the engaging protruding part 117 which erects (which erects under the shaft bearing part 53-5 because it is viewed upside down in FIGS. 3 and 9A to 9C) above the shaft bearing part 53-5 of the third movable lens frame. With this configuration, the magnetic scale 121 is fixed to the scale holding part 117-1 by orientating its scale surface toward the detecting unit 122-1 of the magnetic sensor 122.

This magnetic scale 121 is installed by being fixed to the third movable lens frame 19 via the scale holding part 117-1, whereas the magnetic sensor 122 is fixed to the metal frame 23*a*. Additionally, the third movable lens frame 19 is arranged to be movable along the two guide members (65, 68) against the metal frame 23*a* as described above, whereby also the magnetic sensor 122 and the magnetic scale 121 are arranged to be relatively movable.

This magnetic scale 121 is made of an elastic sheet material, for example, a resinous sheet such as polyester, etc., and obtained by coating a magnetic material on the scale surface side, and by magnetizing the magnetic material at predetermined intervals. To make the magnetic sensor 122 read the magnetism, it is preferable that the scale surface of the magnetic scale 121 and the detecting unit 122-1 of the magnetic sensor 122 are as close as possible at all times.

Accordingly, a board spring 125 is provided. Namely, the board spring 125 comprises a spring part 125-2 which extends downward from an engaging part 125-1 and further extends horizontally in the form of a hook. At the end of the spring part 125-2, a dome-shaped convex part 125-3 which is provided to protrude toward the side of the magnetic scale 121 is formed. This convex part 125-3 is formed in a position corresponding to the detecting unit 122-1 of the magnetic sensor 122.

The engaging part 125-1 of the board spring 125 is fixed to the metal frame 23*a* along with the fixing board 124 of the magnetic sensor holder 126, whereby the convex part 125-3 of the board spring 125 presses a portion, namely, a free end side 121-2, which is not fixed to the engaging part 117-1 of the magnetic scale 121, against the detecting unit 122-1 of the magnetic sensor 122.

As a result, the scale surface of the magnetic scale 121 makes a relative move while sliding and contacting the detecting unit 122-1 of the magnetic sensor 122. The scale surface of the magnetic scale 121 slides and contacts the detecting unit 122-1 of the magnetic sensor 122 in this way, whereby the magnetic sensor 122 can properly read the scale of the magnetic scale 121.

As described above, the portion of the board spring 125, which presses the back side of the scale surface of the magnetic scale 121, is formed by the dome-shaped convex part 125-3. Therefore, frictional resistance with the magnetic scale 121 is extremely small, thereby reducing resistance load generated by the pressing.

Additionally, it is preferable to paste non-magnetic metal foil having a smooth surface, or to form a smooth resinous layer on the back side of the magnetic scale 121. This can suppress the abrasion caused by the friction with the board spring 125 to be low, and the lifetime of the apparatus can be maintained for a long time.

<Flexible Board>

A flexible board arranged between the external electrodes of the vibrator 70 of the vibration wave linear motor 46 and the driving circuit 110 is described next.

FIGS. 12A and 12B are perspective views respectively showing the above described vibration wave linear motor 46, and the flexible board arranged between the external electrodes of the vibrator 70 of the vibration wave linear motor 46 and the driving circuit 110.

As described above (see FIG. 5A), the 4 electrode connecting external terminals (A+ electrode connecting external terminal 98, the A− electrode connecting external terminal 99, the B+ electrode connecting external terminal 101, and the B− electrode connecting external terminal 102) of the A phase and the B phase, which are arranged in the vibrator 70 and made of baked silver, are connected to the terminals for an external connection within the respective electrode foils, on the side of the vibrator, where these terminals are provided to protrude.

Namely, the above described 4 A phase and B phase electrode connecting external terminals are arranged on one side of the two side surfaces (where the guide members 77 are not arranged) which do not face the guide members 77 in the direction (namely, the self-running direction of the vibrator 70) of the two guide members 77 of the vibrator 75. An electrode connecting part 130-1 of the flexible board 130 is arranged by being electrically connected to the 4 electrode connecting external terminals arranged only on one side surface.

For the flexible board 130, firstly as shown in FIG. 12A, a wiring part 130-2 is separated into two portions in the forward and backward directions of the self-running direction of the vibrator 70 from an end (the electrode connecting part 130-1) connected to the electrodes (the 4 A phase and B phase electrode connecting external terminals) to the driving circuit 110. Additionally, wiring parts 130-2, which are separated as two branches, are formed to be identical in width.

In this vibration wave linear motor 46, both of the ends of the two guide members 77 (77-1, 77-2) are respectively held by the erecting parts 78-2 existing at both of the ends of the supporting part 78. However, the wiring parts 130-2, which are separated as two branches, of the flexible board 130 are curved toward the central portion in the neighborhoods of both of the ends of the supporting part 78, namely, the two erecting parts 78-2, and merge in the central portion.

Additionally, at one end (both of the ends in this example) of at least one of the two erecting parts 78-2, which are the ends of the supporting part 78, an open part 78-3, which allows the curving wiring parts 130-2 of the flexible board 130 to enter and exit when the parts curve and move with the self-running of the vibrator 70, are provided.

Furthermore, in the vibrator unit 75 of the vibration wave linear motor 46, the pin member installment hole 103 is formed in a position in the neighborhood of the above described A phase and B phase electrodes as shown in FIG. 5A. With the pin member installment hole 103, the pin member 120 for linking to the engaging protruding part 117 of the third movable lens frame 19 is provided to protrude in a direction orthogonal to the self-running direction of the vibrator 70 as shown in FIGS. 9A, 9B, 10A, and 10B. The above described flexible board 130 comprises an unimpeding hole 130-3, which does not impede the protrusion of the pin member 120, in the electrode connecting part 130-1.

As described above, for the flexible board 130 in this preferred embodiment, the electrode connecting external terminals to be connected of the vibration unit 75 are arranged on only one of the two side surfaces of the vibrator unit 75, whereby the wiring of the flexible board 130 to the driving circuit 110 can be concentrated in one portion. As a result, a reduction in the size of the entire apparatus can be promoted.

Additionally, the open parts 78-3 in/from which the curving wiring parts 130-2 of the flexible board 130 can enter/exit, are provided in the erecting parts 78-2 of the supporting part 78. Therefore, the space where the flexible board 130 is accommodated when the curving wiring parts 78-3 curve and move with the self-running of the vibrator 70 is enlarged, whereby the load of curving fluctuations of the curving wiring parts 130-2 of the flexible board 130 with the self-running of the vibrator 70 is reduced, leading to the facilitation of the self-running of the vibrator 70.

Furthermore, the preventing hole 130-3, which does not impede the protrusion of the pin member 120, is comprised, in the electrode connecting part 130-1 of the flexible board 130, whereby the flexible board 130 can be arranged between the third movable lens frame linked by the pin member 120 and the vibrator 70, and a size reduction in a main body apparatus such as the lens apparatus 1, etc., in which the vibration wave linear motor 46 is embedded, is promoted.

Still further, if the small vibration wave linear motor comprising the self-running vibrator is comprised as the driving source of a lens frame for achieving a focus as described above, the lens apparatus that calmly makes lens driving can be provided.

Besides, in this case, the curving wiring parts of the flexible board of the vibration wave linear motor are arranged between the vibrator and the lens frame linked to the vibration wave linear motor and driven as described above, whereby the lens apparatus further reduced in size can be provided.

Still further, as shown in FIG. 12B, also a configuration where the wiring part 130-2 of the flexible board 130 is not branched, and only one wiring part 130-2 is arranged along the proceeding direction of the vibrator can contribute to a reduction in the size of the entire apparatus. The configuration where only one wiring part 130-2 of the flexible board 130 is arranged along the proceeding direction of the vibrator 70 as described above is effective for an arrangement configuration of two vibrators 70 as will be described later.

Namely, if only one wiring part 130-2 of the flexible board 130 is respectively arranged on the mutually opposite sides of the two vibrators, the wiring parts 130-2 of the flexible board 130 respectively for the two vibrators do not interfere with each other, thereby facilitating the assembly.

Second Preferred Embodiment

<Vibration Wave Linear Motor of a Two-vibrator Type>

Figure 13A:
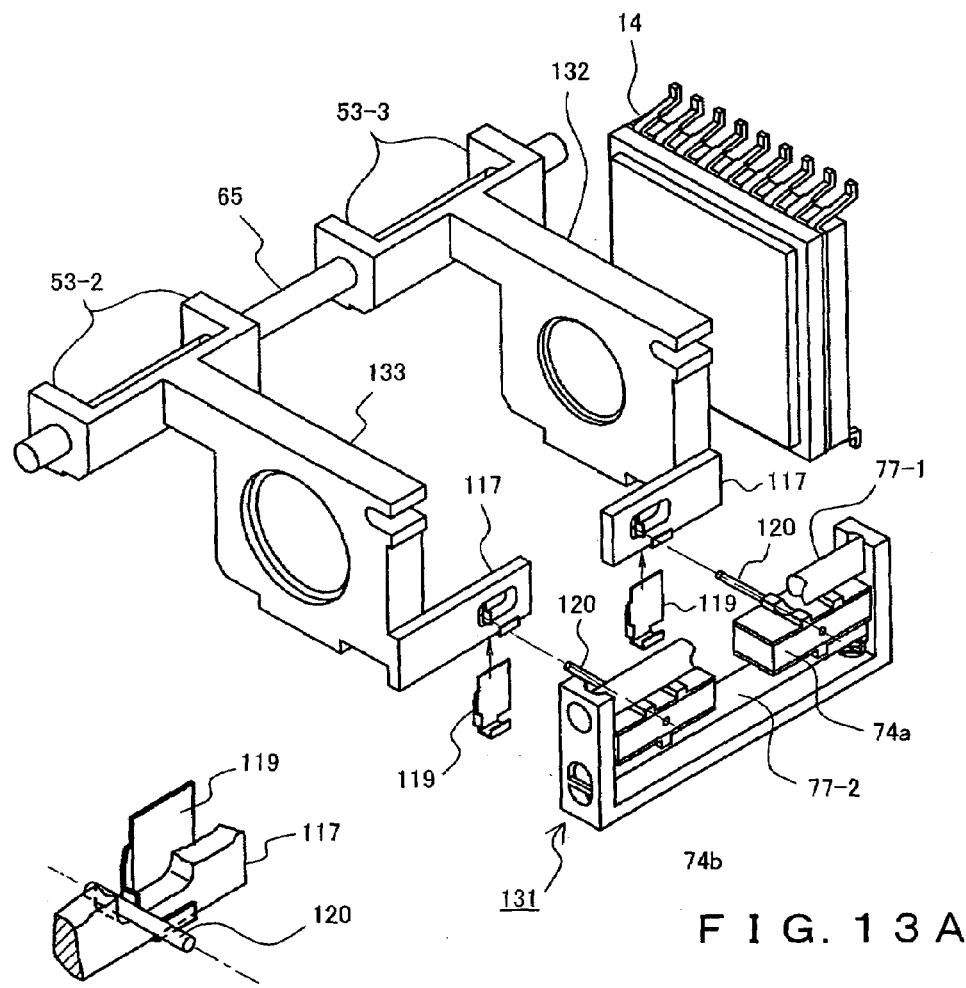
FIG. 13A is a perspective view explaining a method linking a vibration wave linear motor of a two-vibrator type in the second preferred embodiment, and two driving targets.
Figure 13B:
FIG. 13B is an enlarged perspective view showing only the linked portion.

FIG. 13A is a perspective view explaining a method linking a vibration wave linear motor comprising two vibrators according to the second preferred embodiment and two driving targets, whereas FIG. 13B is an enlarged perspective view showing only the linked portion. FIG. 13B shows the same configuration as that in FIG. 9B. In FIGS. 13A and 13B, the same constituent elements as those shown in FIGS. 9A and 9B are denoted with the same reference numerals.

As shown in FIG. 13A, the vibration wave linear motor 131 according to this preferred embodiment is a vibration wave linear motor of a two-vibrator type, in which 2 vibrators 74 (74a, 74b) shown in FIGS. 8E and 8F are sandwiched by two guide members 77 (77-1, 77-2). The respective 2 vibrators 74 are individually and electrically connected to a driving circuit 110 by the flexible board 130 and the electrode connecting part 130-1, which are shown in FIG. 12B, and individually driven with an independent operation. A method driving the vibrators 74 is as described above with reference to FIGS. 5A to 5F, and 6.

Additionally, in FIG. 13A, two lens frames 132 and 133, which are individually driven by the two vibrators 74 via a pin member 120, a board spring 110, and an engagement protruding part 117, are shown. The vibrator 74a drives the lens frame 132, whereas the vibrator 74b drives the lens frame 133. The driving of these lens frames is as described above with reference to FIGS. 9A, 9B, 10A, and 10B.

The lens frame 132 of the two lens frames 132 and 133 corresponds to the lens frame of the third lens unit group in the lens apparatus (not shown) in this preferred embodiment, and corresponds, for example, to the third movable lens frame 19 shown in FIG. 2, 3, or 9A. Additionally, the lens frame 133 is the lens frame of the second lens unit group in the lens apparatus in this embodiment. However, its con-figuration and action are different from those of the second movable lens frame 18 shown in FIG. 2 or 3 in this embodiment.

Figure 14:
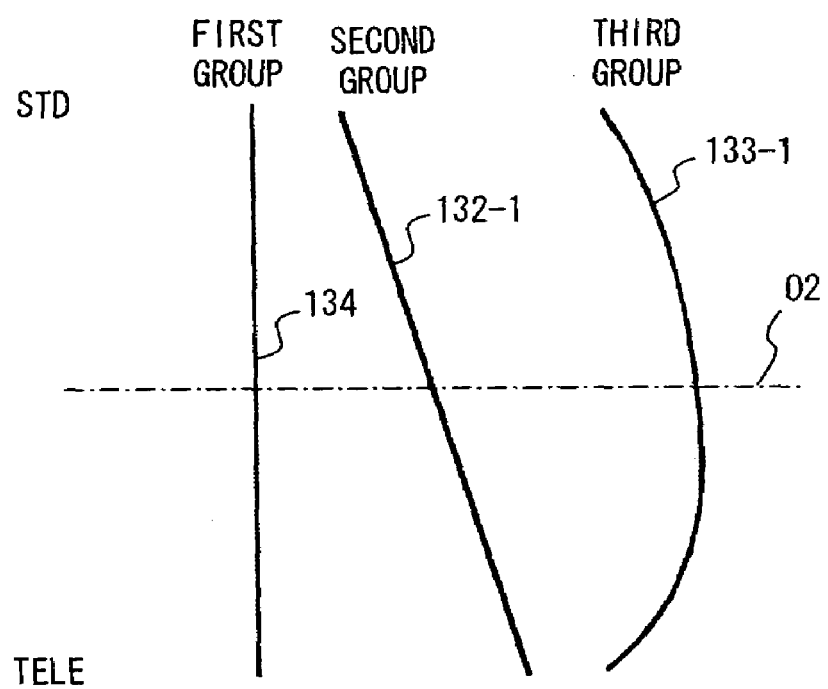
FIG. 14 is a schematic explaining the operations and actions of a first lens unit group, a second lens unit group, and a third lens unit group in a lens apparatus using the vibration wave linear motor according to the second preferred embodiment.

FIG. 14 is a schematic explaining operations and actions of the first, the second, and the third lens unit groups in the lens apparatus in this embodiment. The first lens unit group 134 in the lens apparatus in this embodiment, which is shown in FIG. 14, is a fixed lens unit group.

As shown in FIG. 14, the second lens unit group 132-1 of the lens frame 133, which is driven by the vibrator 74b of the vibration wave linear motor 131, linearly moves toward or away from the fixed first lens unit group 134 along the optical axis O2, and zooms in/out an incident image. In the meantime, the third lens group unit 133-1 of the lens frame 132, which is driven by the vibrator 74a, does not linearly move toward or away in correspondence with the linear move of the second lens unit group 132-1. The third lens unit group 133-1 achieves a suitable focus on an image capturing element 14 by moving toward or away from the second lens unit group 132-1 along the optical axis O2 according to the ratio of zooming.

As a matter of course, the fixed first group is not always required when zooming or focus achievement is made. Additionally, the movement of the second and the third groups can possibly become reverse depending on a lens design. Furthermore, a fixed group can be added in a suitable position in addition to these groups.

<Vibrator of a Three-driving Contacting Part Type>

Here, the reason that the two vibrators 74 in this embodiment are configured to comprise the three driving contacting parts is described.

Figure 15:
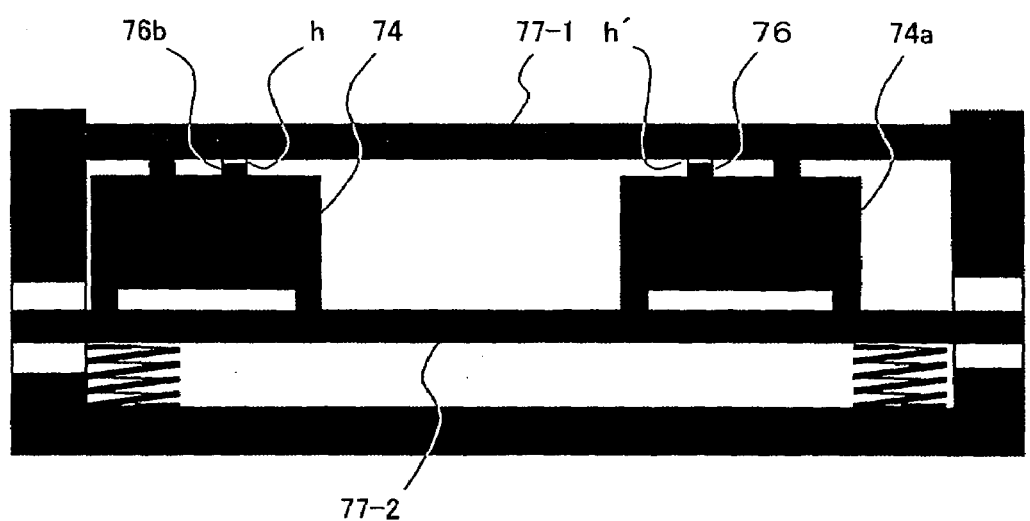
FIG. 15 is a schematic explaining that an advantage cannot be obtained by a configuration where each of two vibrators respectively comprises 4 driving contacting parts in the vibration wave linear motor of a two-vibrator type according to the second preferred embodiment.

FIG. 15 is a schematic explaining that an advantage cannot be obtained by a configuration where the vibrators 74a and 74b are configured to respectively comprise 4 driving contacting parts when the vibration wave linear motor is configured to comprise two vibrators.

Generally, the heights, and the degrees of parallelism (the heights and the degrees of parallelism of the two guide members 77-1 and 77-2 when the guide members 77-1 and 77-2 contact) of the two vibrators 74 (74a, 74b) do not strictly match.

Accordingly, even if one vibrator 74 is designed to comprise 4 driving contacting parts 76 when the two vibrators 74 are provided, a gap h or h' actually occurs between the guide member 77 and any one of the two driving contacting parts 76 (the driving contacting parts 76 on the side of the upper guide member 77-1 in the example shown in this figure) on a side of a narrow arrangement interval.

That is, even if one of the vibrators 74 is designed to comprise 4 driving contacting parts 76, only 3 driving contacting parts always contact the guide members 77. Accordingly, initially designing the vibrator 74 that comprises 3 driving contacting parts 76 shown in FIGS. 8C and 8D, or the vibrators 74 (74a, 74b) shown in FIG. 13A simplifies the configuration, and is advantageous for reductions in cost and size.

Figure 16A:
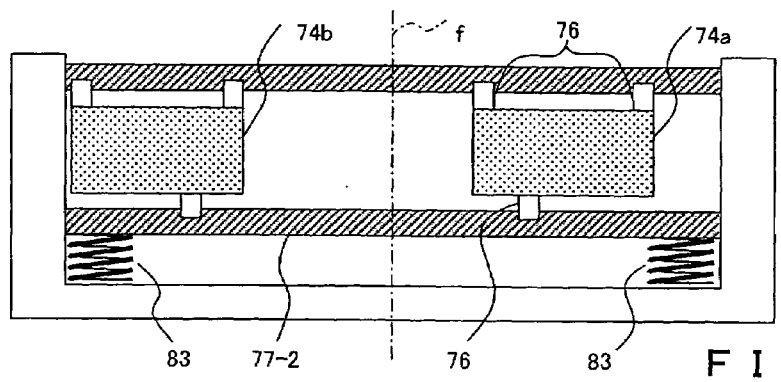
FIGS. 16A to 16D are schematics exemplifying various types of a vibrator having 3 driving contacting parts in the vibration wave linear motor as the second preferred embodiment.
Figure 16B:
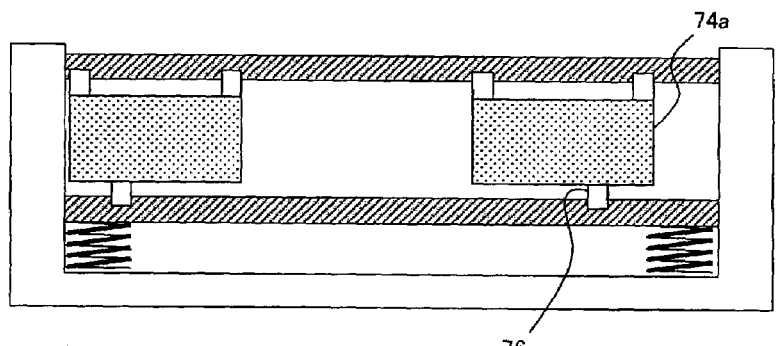
Figure 16C:
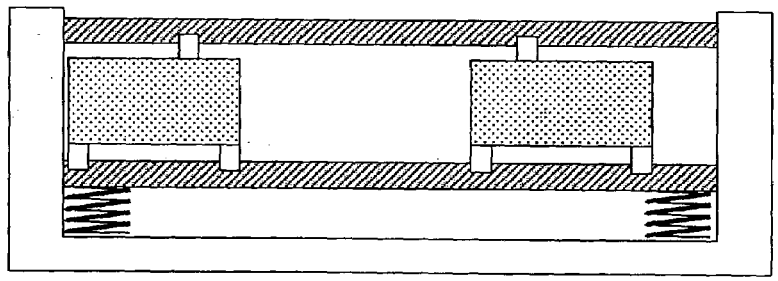
Figure 16D:
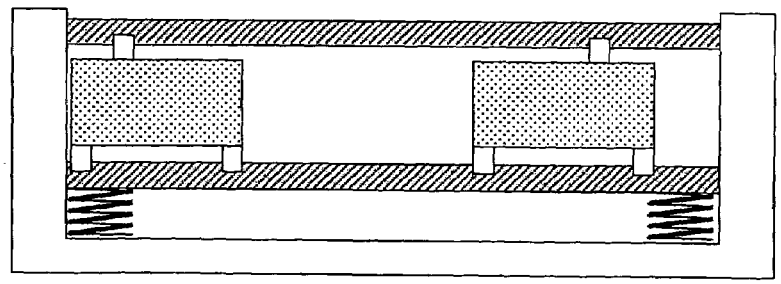

FIGS. 16A to 16D are schematics exemplifying various configurations of the vibrator comprising 3 driving contacting parts. FIGS. 16A and 16B show a configuration where each of the vibrators 74 (74a, 74b) comprises 2 and 1 driving contacting parts 76 respectively on top and bottom surfaces. FIGS. 16C and 16D show a configuration where each of the vibrators 74 comprises, 2 and 1 driving contacting parts 76 respectively on bottom and top surfaces.

Here, assuming that the pressing powers of the spiral springs 83 (see also FIGS. 4A and 4B), which press both ends of the lower guide member 77-2 (hereinafter referred to simply as a movable shaft), are equal, a middle position f between the spiral springs 83, which is shown in FIG. 16A, is recognized as a position in which the pressing forces achieve a balance, and this position is referred to as a pressing force balanced position f.

If the pressing forces of the two spiral springs 83 are unequal, the above described pressing force balanced position f moves toward a spiral spring 83 having higher pressing force according to the principle of leverage. In this embodiment, the pressing forces of the two spiral springs 83 are adjusted in advance so that the pressing force balanced position f becomes as close to the middle position of the movable shaft as possible.

Generally, the position in which the pressing forces achieve a balance is a position in which the torque balance of the total pressing force achieves a balance, and the two shafts are held parallel when one point of the movable shaft is pressed to widen the spacing between the two shafts, and a predetermined pressing force is reached.

In FIG. 16A, the respective one driving contacting part 76 on the side of the movable shaft is closer to the side of the pressing force balanced position f of the movable shaft from the middle of the vibrators 74. In the meantime, in FIG. 16B, the respective one driving contacting part 76 is apart from the middle of the vibrator 74 with reference to the pressing force balanced position f of the movable shaft. Both of these arrangement configurations are the same as those of the vibrator 74 shown in FIGS. 8C and 8D.

FIG. 16C shows a configuration obtained by turning the two vibrators 74 shown in FIG. 16A upside down, whereas FIG. 16D shows a configuration obtained by turning the two vibrators 74 shown in FIG. 16B upside down. In addition to the 4 arrangement configurations shown in FIGS. 16A to 16D, two configurations where only one contacting driving part 76, which is arranged on a side where only the one driving contacting part is arranged, is positioned in the middle of the vibrator 74 can be considered.

<Restriction to the Running Range of a Vibrator>

In the above described configurations shown in FIGS. 16A and 16B, especially in the configuration shown in FIG. 16A, for example, if the vibrator 74 on the right side is driven to run toward the left, and its front end in the running direction exceeds the pressing force balanced position f, a faulty contact can possibly occur between the vibrator 74 on the left side and the movable shaft.

FIG. 17 shows a case where such a faulty contact occurs between one of the 2 vibrators 74 and the movable shaft. As shown in this figure, when the vibrator 74a on the right side is driven to run toward the left by being applied with a voltage, and only one driving contacting part 76 which contacts the movable shaft enters the left side region beyond the pressing force balanced position f, namely, when all of the driving contacting parts 76 are concentrated on one side (the left side in the example shown in FIG. 17) of the pressing force balanced position f, the right and the left portions of the movable shaft are respectively inclined up and down to a large extent.

If the movable shaft is inclined as described above, the one driving contacting part 76 on the bottom surface of the vibrator 74b on the left side drops due to its self-weight and contacts the movable shaft after apart from the contact with the movable shaft. However, either of the 2 driving contacting parts 76 on the top surface of the vibrator 74b on the left side, which is inclined due to the drop, is apart from the contact with the upper guide member 77-1. In the worst case, both of the two driving contacting parts 76 can possibly be apart, and the vibrator 74b on the left side can possibly come off from the two guide members 77-1 and 77-2. Or, a similar problem can occur also when the vibrator 74b on the left side runs toward the right.

FIGS. 18A to 18C respectively show a configuration of a vibration wave linear motor of a two-vibrator type, which prevents the above described faulty contact between the vibrator and the movable shaft from occurring.

In a vibration wave linear motor 131-1 shown in FIG. 18A, an arrangement configuration of one driving contacting part 76 on the bottom surface of the two vibrators is the same as that of the two vibrators, which is shown in FIG. 16A.

In this configuration, a stopper 135 provided to protrude upward from the middle of the base part 78-1 of the supporting part 78 is arranged. The stopper 135 is formed so that its top end is cut to fit into the outer diameter of the movable shaft, and the cut top end impinges on the one driving contacting part 76 on the bottom surface of each of the left and the right vibrators 74a and 74b. FIG. 18A shows a state where the one driving contacting part 76 on the bottom surface of the vibrator 74a on the right side is about to impinge on the stopper 135.

The position of the stopper 135 provided to be erect in the middle of the base part 78-1 of the supporting part 78 is the pressing force balanced position f, and the one driving contacting part 76 on the bottom surface impinges on the stopper 135 and stops. As a result, the driving contacting parts 76 that contact the movable shaft always exist on the left and the right sides of the pressing force balanced position f, and a faulty contact between the vibrator and the movable shaft, which is shown in FIG. 17, can be prevented from occurring.

In a vibration wave linear motor 131-2 shown in FIG. 18B, an arrangement configuration of one driving contacting part 76 on the bottom surface of the two vibrators is the same as that of the 2 vibrators, which is shown in FIG. 16B.

In this case, the one driving contacting part 76 on the bottom surface, which impinges on a stopper 135, is arranged in a position apart from the middle of the vibrator 74 with reference to the pressing force balanced position f of the movable shaft. For this reason, the vibrator 74a or 74b can enter the opposite side from the pressing force balanced position f by the distance of the position apart from the middle. Namely, the running ranges of the two vibrators 74a and 74b can be widened.

FIG. 18C shows a configuration where a stopper 136 is arranged to protrude upward from the middle of the base part 78-1 of the supporting part 78 in a similar manner. In this case, the cut top end is formed to be a length that impinges on the end surface of the vibrator 74a or 74b in the running direction. As a result, the end surface in the running direction impinges on the stopper 136, so that the vibrator 74a or 74 stops.

This configuration makes the running ranges of the two vibrators 74a and 74b narrowest. However, since the stopper 136 is interposed between the end surfaces of two vibrators 74a and 74b in the running direction, there is no fear that the two vibrators 74a and 74b collide with each other and are damaged on some impact, for example, at the time of shipment from a factory, or during idle time.

Also in the configurations shown in FIGS. 18A and 18B, adhering a cushioning material to the end surfaces of the two vibrators 74a and 74b in the running direction eliminates the above described fear.

<Vibrator Driving Method for a Two-vibrator Type>

For a portable electronic device such as a digital camera, etc., which uses the above described vibration wave linear motor, a battery is used as a power source. Normally, if a high electric current is applied in such a device using a battery as a power source, a voltage drop occurs due to the internal resistance of the battery. If the voltage drop occurs, a circuit, which operates at a predetermined voltage or higher and normally exists in the internal circuitry of the device, cannot possibly operate. Accordingly, it is preferable to avoid the use of a high current that causes a voltage drop, especially, in a portable device, in order not to cause a trouble in the control of the entire device.

Accordingly, in this embodiment, either of the two vibrators 74a and 74b. is driven, or the two vibrators 74 are alternately driven to make an electric current that instantaneously flows low. Normally, the driving operation of the vibration wave linear motor is extremely strong and high-speed, a user notices almost no difference in its functional action between when both of the two vibrators are simultaneously driven and when either of the two vibrators is driven or the two vibrators are alternately driven. For example, in the configuration shown in FIGS. 13A and 14, a user can use the apparatus as if he or she makes zooming not intermittently but continuously and smoothly.

Figure 19:
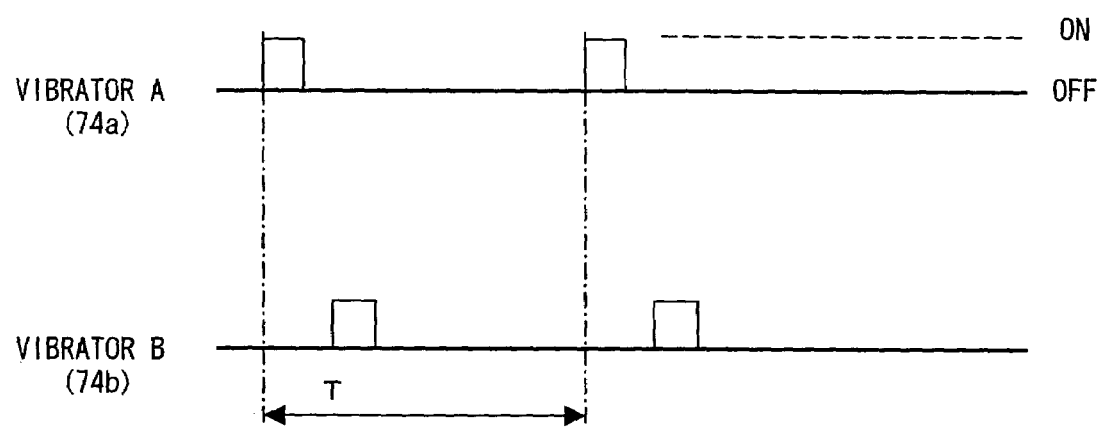
FIG. 19 is a chart showing timing at which the two vibrators of the vibration wave linear motor of a two-vibrator type are driven.

FIG. 19 is a chart showing timing when the above described two vibrators 74a and 74b are driven. In this embodiment, the two vibrators 74a and 74b are not simultaneously driven, and either of the two vibrators 74a and 74b is driven, or the two vibrators 74a and 74 are alternately driven as shown in FIG. 19. Namely, the two vibrators 74a and 74b are never driven simultaneously. As a result, the electric current that instantaneously flows can be made low as described above.

Additionally, if an electric current used is low as described above, wires can be formed thin to an extent that they are not burnt out. If the wires become thin, not only the flexible board 130 and the electrode connecting part 130-1 but also the controlling circuit can be further reduced in size. As a result, the configuration of the entire apparatus can be reduced in size.

As described above, the vibration wave linear motor according to this preferred embodiment has a small configuration where the driving engagement of the driving contacting parts and the guide members also serves as a rotation stopper, which eliminates the need for a dedicated rotation stopper, and two driving targets can be driven in small space by arranging the two vibrators between the two guide members. This can greatly contribute to a reduction in the size of the entire apparatus.

Additionally, the movable ranges of the two vibrators are restricted not to overlap, and an unnecessary collision between the two vibrators is prevented. As a result, the life span of the vibrators can be extended, and a small-sized actuator with a long life span, on which special emphasis is placed from a practical standpoint, can be implemented.

Furthermore, a driving contacting part, to which no pressing force is applied, does not exist, namely, pressing force is always applied to driving contacting parts, whereby a small-sized actuator having no wasted space and a high energy efficiency can be provided.

What is claimed is:

1. A vibration wave linear motor, comprising:
   two vibrators respectively having a vibrator unit configured to comprise a piezoelectric unit, and at least one driving contacting part respectively provided on two opposed surfaces of the vibrator unit;
   two guide members sandwiching the two vibrators via the driving contacting parts; and
   a pressing member pressing one of the two guide members toward the other, and generating pressing force between the two guide members and the driving contacting parts, wherein
   the driving contacting parts convert a vibration generated by applying a voltage to the vibrator unit into driving force, whereby the two vibrators and the two guide members make a relative move.

2. The vibration wave linear motor according to claim 1, wherein each of the vibrators comprises 3 driving contacting parts.

3. The vibration wave linear motor according to claim 2, wherein one of the three driving contacting parts, which is on a side where only the one driving contacting part is provided, of the two vibrators is configured to contact a same guide member of the two guide members.

4. The vibration wave linear motor according to claim 1, further comprising a holding member fixing and holding one of the guide members, and holding the other of the guide members to be movable in a direction pressed by the pressing member.

5. The vibration wave linear motor according to claim 2, further comprising a holding member fixing and holding one of the guide members, and holding the other of the guide members to be movable in a direction pressed by the pressing member.

6. The vibration wave linear motor according to claim 5, wherein one of the three driving contacting parts, which is on the side where only the one driving contacting part is provided, of the two vibrators is configured to contact the guide member, which is fixed and held by the holding member, of the two guide members.

7. The vibration wave linear motor according to claim 5, wherein one of the three driving contacting parts, which is on the side where only the one driving contacting part is provided, of the two vibrators is configured to contact the guide member, which is held by the holding member to be movable in the pressing direction, of the two guide members.

8. The vibration wave linear motor according to claim 4, further comprising a stopper restricting a move range of at least one of the vibrators.

9. The vibration wave linear motor according to claim 8, wherein the stopper divides move ranges of the two vibrators as two ranges partitioned in a position, where pressing force of the guide member held by the holding member to be movable in the pressing direction achieves a balance, as a middle.

10. The vibration wave linear motor according to claim 9, wherein the position where the pressing force of the guide member achieves a balance is an approximately middle position of the guide member in the move direction of the vibrators.

11. The vibration wave linear motor according to claim 8, wherein the stopper divides move ranges of the one driving contacting parts, each of which is provided on one side, where only the one driving contacting part is provided, of the two vibrators, as two ranges partitioned in the position, where the pressing force achieves a balance, as a middle.

12. The vibration wave linear motor according to claim 11, wherein the stopper restricts the move range of the vibrator by impinging on the one driving contacting part on the side, where only the one driving contacting part is provided, of the vibrators in a predetermined position.

13. The vibration wave linear motor according to claim 11, wherein the position where the pressing force of the guide member achieves a balance is approximately a middle position of the guide member in the move direction of the vibrator.

14. The vibration wave linear motor according to claim 11, wherein between the two vibrators, a shortest distance between driving contacting parts which contact a same guide member is longer than a distance between the one driving contacting parts on the side where only the one driving contacting part is provided.

15. The vibration wave linear motor according to claim 13, wherein between the two vibrators, the one driving contacting parts on the side, where only the one driving contacting part is provided, of the vibrators are provided in positions symmetrical with each other in the move direction of the vibrators.

16. The vibration wave linear motor according to claim 1, further comprising
a stopper restricting the move range of at least one of the vibrators.

17. The vibration wave linear motor according to claim 1, wherein the two vibrators are driven one by one.

18. The vibration wave linear motor according to claim 1, wherein the two vibrators are alternately driven.

19. A vibration wave linear motor, comprising:
two vibrators respectively having a vibrator unit configured to comprise a piezoelectric unit, and at least one driving contacting means respectively provided on two opposed surfaces of the vibrator unit;
two guide means sandwiching the two vibrators via the driving contacting means; and
a pressing means pressing one of the two guide means toward the other, and generating pressing force between the two guide means and the driving contacting means, wherein
the driving contacting means convert a vibration generated by applying a voltage to the vibrator unit into driving force, whereby the two vibrator means and the two guide means make a relative move.

20. A method driving a vibration wave linear motor, which comprises two vibrators respectively having a vibrator unit configured to comprise a piezoelectric unit, and at least one driving contacting part respectively provided on two opposed surfaces of the vibrator unit, two guide members sandwiching the two vibrators via the driving contacting parts, and a pressing member pressing one of the two guide members toward the other, and generating pressing force between the two guide members and the driving contacting parts, wherein the driving contacting parts convert a vibration generated by applying a voltage to the vibrator unit into driving force, whereby the two vibrators and the two guide members make a relative move, comprising
driving the two vibrators one by one.

* * * * *